(12) United States Patent
Wang

(10) Patent No.: US 10,038,899 B2
(45) Date of Patent: Jul. 31, 2018

(54) FILE FORMAT FOR VIDEO DATA

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 972 days.

(21) Appl. No.: 14/043,383

(22) Filed: Oct. 1, 2013

(65) Prior Publication Data

US 2014/0098860 A1    Apr. 10, 2014

Related U.S. Application Data

(60) Provisional application No. 61/709,748, filed on Oct. 4, 2012.

(51) Int. Cl.
*H04N 7/36* (2006.01)
*H04N 19/503* (2014.01)
(Continued)

(52) U.S. Cl.
CPC ....... *H04N 19/00575* (2013.01); *H04N 19/31* (2014.11); *H04N 19/70* (2014.11)

(58) Field of Classification Search
CPC ....... H04N 19/00575; H04N 19/00763; H04N 19/00781; H04N 19/70; H04N 19/31
(Continued)

(56) References Cited

U.S. PATENT DOCUMENTS

2007/0016594 A1    1/2007   Visharam et al.
2009/0278715 A1*  11/2009   Fenney ............... H03M 7/4006
                                                            341/51
(Continued)

FOREIGN PATENT DOCUMENTS

CN           1973545 A       5/2007
JP        2007537639 A      12/2007
(Continued)

OTHER PUBLICATIONS

Response to Written Opinion dated Oct. 15, 2014, from International Application No. PCT/US2013/062992, filed on Jan. 12, 2015, 4 pp.

(Continued)

*Primary Examiner* — Andy Rao
*Assistant Examiner* — Zaihan Jiang
(74) *Attorney, Agent, or Firm* — Shumaker & Sieffert, P.A.

(57) ABSTRACT

A device generates a file that stores coded samples that contain coded pictures of the video data. The file also includes a sample entry that includes an element that indicates whether all sequence parameter sets (SPSs) that are activated when a stream to which the sample entry applies is decoded have syntax elements that indicate that temporal sub-layer up-switching to any higher temporal sub-layer can be performed at any sample associated with the SPSs. The same or different device determines, based on the element in the sample entry, that all SPSs that are activated when the stream to which the sample entry applies is decoded have syntax elements that indicate that temporal sub-layer up-switching to any higher temporal sub-layer can be performed at any sample associated with the SPSs.

48 Claims, 6 Drawing Sheets

(51) Int. Cl.
*H04N 19/70* (2014.01)
*H04N 19/31* (2014.01)

(58) Field of Classification Search
USPC .................................................. 375/240.13
See application file for complete search history.

(56) References Cited

U.S. PATENT DOCUMENTS

| | | | |
|---|---|---|---|
| 2010/0189182 A1 | 7/2010 | Hannuksela | |
| 2012/0102042 A1 | 4/2012 | Flick et al. | |
| 2012/0121011 A1 | 5/2012 | Coban et al. | |
| 2012/0170648 A1 | 7/2012 | Chen et al. | |
| 2012/0183076 A1 | 7/2012 | Boyce et al. | |
| 2012/0185570 A1 | 7/2012 | Bouazizi et al. | |
| 2012/0230433 A1 | 9/2012 | Chen et al. | |
| 2013/0094774 A1 | 4/2013 | Misra et al. | |
| 2013/0170561 A1 | 7/2013 | Hannuksela | |
| 2013/0195205 A1 | 8/2013 | Wang et al. | |
| 2014/0022343 A1* | 1/2014 | Chen | H04N 19/70 348/43 |
| 2014/0092953 A1* | 4/2014 | Deshpande | H04N 19/31 375/240.01 |
| 2014/0098868 A1 | 4/2014 | Wang | |

FOREIGN PATENT DOCUMENTS

| | | |
|---|---|---|
| JP | 2010507346 A | 3/2010 |
| TW | 201234857 A | 8/2012 |
| WO | 2005112464 A1 | 11/2005 |
| WO | 2008048886 A2 | 4/2008 |
| WO | 2013006114 A2 | 1/2013 |
| WO | 2013109178 A1 | 7/2013 |
| WO | 2014054285 A1 | 4/2014 |

OTHER PUBLICATIONS

Second Written Opinion dated Mar. 20, 2015, from International Application No. PCT/US2013/062992, 6 pp.
Response to Second Written Opinion dated Mar. 20, 2015, from International Application No. PCT/US2013/062992, filed on Apr. 13, 2015, 29 pp.
International Preliminary Report on Patentability from International Application No. PCT/US2013/062992, dated May 12, 2015, 8 pp.
"Text of ISO/IEC 14496-15: 2010 PDAM 2 Carriage of High efficiency Video Coding (HEVC)," MPEG Meeting; Apr. 30, 2012-May 4, 2012; Geneva; (Motion Picture Expert Group or ISO/IEC JTC1/SC29/WG11), No. N12647, May 5, 2012, XP030019121, 17 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
"Information technology—Coding of audio-visual objects—Part 15: Advanced Video Coding (AVC) file format, Amendment 2: Carriage of high-efficiency video coding (HEVC)," ISO/IEC JTC 1/SC 29, ISO/IEC 14496-15:2010/DAM 2, ISO/IEC JTC 1/SC 29/WG 11, (40) Enquiry, STD Version 2.1,c2, May 9, 2012, 28 pp.
International Search Report and Written Opinion—PCT/US2013/062992—ISA/EPO—dated Oct. 15, 2014, 10 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Sjoberg et al., "High-Level Syntax for Bitstream Extraction," JCT-VC Meeting; MPEG Meeting; Geneva; (Joint Collaborative Team on Video Coding of ISO/IEC JTC1/SC29/WG11 and ITU-T SG.16); URL: http://wftp3.itu.int/av-arch/jctvc-site/,No. Document JCTVC-G607, Nov. 21-30, 2011, 14 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
Sjoberg et al., "Overview of HEVC High-Level Syntax and Reference Picture Management," IEEE Transactions on Circuits and Systems for Video Technology, vol. 22, No. 12, Dec. 2012, 13 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
"Information Technology—Coding of Audio-Visual Objects—Part 15: Carriage of NAL Unit Structured video in the ISO Base Media File Format, Amendment 2: Carriage of High Efficiency Video Coding (HEVC)," ISO/IEC 14496-15:2010/PDAM 2, May 9, 2012, 24 pp.
Bross B., et al., "High efficiency video coding (HEVC) text specification draft 8 (Jctvc-J1003_d7)", Joint collaborative Team on Video Coding (JCT-VC) of ITU-T SG1 WP3 and ISO/IEC JTC1/SC29/WG11 10th Meeting: Stockholm, Jul. 28, 2012 (Jul. 28, 2012), pp. 1-250, XP055093210.
Okubo E., "Impress Standard Textbook Series Third Revised Edition H.264/AVC Textbook", Japan, Impress R&D Co., Ltd., Jan. 1, 2009, pp. 223-231, ISBN: 978-4-8443-2664-9.
Wang Y-K., et al., "AHG10: NUH, VPS and SPS syntax designs agreed by the BoG on VPS and NUH [online]," BoG on VPS and NUH, JCTVC-J0550, 10th Meeting, Jul. 11-20, 2012, URL:http://phenix.it-sudparis.eu/jct/doc_end_user/documents/10_Stockholm/wg11/JCTVC-J0550-v3.zip, 14 pages.
International Standard ISO/IEC 14496-15, Information Technology—Coding of audio-visual objects—Part 15: Carriage of network abstraction layer (NAL) unit structured video in ISO base media file format, Third Edition, the 101th meeting of MPEG, Stockholm, Sweden, Jul. 19, 2012 to Jul. 20, 2012, 136 pp.
"Text of ISO/IEC 14496-15: 2010 PDAM 2 Carriage of NAL unit structured video in the ISO Base Media File Format Amendment 2: Carriage of high efficiency video coding (HEVC)"; Jul. 19, 2012 (Motion Picture Expert Group or ISO/IEC JTC1/SC29/WG11), 24 pp.

* cited by examiner

FILE FORMAT FOR VIDEO DATA

This application claims the benefit of U.S. Provisional Patent Application No. 61/709,748, filed Oct. 4, 2012, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes techniques for storage of video content. In some examples, the techniques provide for storage of High Efficiency Video Coding (HEVC) content in a file based on an International Organization for Standardization (ISO) base media file format (ISOBMFF). For instance, a device may generate a file that stores coded samples that contain coded pictures of the video data. The file may also include a box that includes a record that includes an element that indicates whether all sequence parameter sets (SPSs) that are activated when a stream to which the record applies is decoded have syntax elements that indicate that temporal sub-layer up-switching to any higher temporal sub-layer can be performed at any sample associated with the SPSs. The same or different device may determine, based on the element in the record, that all SPSs that are activated when the stream to which the record applies is decoded have syntax elements that indicate that temporal sub-layer up-switching to any higher temporal sub-layer can be performed at any sample associated with the SPSs.

In one example, this disclosure describes a method of processing video data, the method comprising determining, based on an element in a sample entry of a file that contains samples that contain coded pictures of the video data, that all SPSs that are activated when a stream to which the sample entry applies is decoded have syntax elements that indicate that temporal sub-layer up-switching to any higher temporal sub-layer can be performed at any sample associated with the SPSs.

In another example, this disclosure describes a method of storing coded video data, the method comprising generating a file that stores coded samples that contain coded pictures of the video data, the file also including a sample entry that includes an element that indicates whether all SPSs that are activated when a stream to which the sample entry applies is decoded have syntax elements that indicate that temporal sub-layer up-switching to any higher temporal sub-layer can be performed at any sample associated with the SPSs.

In another example, this disclosure describes a device comprising one or more processors configured to determine, based on an element in a sample entry of a file that contains samples that contain coded pictures of video data, that all SPSs that are activated when a stream to which the sample entry applies is decoded have syntax elements that indicate that temporal sub-layer up-switching to any higher temporal sub-layer can be performed at any sample associated with the SPSs.

In another example, this disclosure describes a device comprising one or more processors configured to generate a file that stores coded samples that contain coded pictures of video data, the file also including a sample entry that includes an element that indicates whether all SPSs that are activated when a stream to which the sample entry applies is decoded have syntax elements that indicate that temporal sub-layer up-switching to any higher temporal sub-layer can be performed at any sample associated with the SPSs.

In another example, this disclosure describes a device comprising: means for receiving a file that contains samples that contain coded pictures of video data; and means for determining, based on an element in a sample entry of the file, that all SPSs that are activated when a stream to which the sample entry applies is decoded have syntax elements that indicate that temporal sub-layer up-switching to any higher temporal sub-layer can be performed at any sample associated with the SPSs.

In another example, this disclosure describes a device comprising: means for generating a file that stores coded samples that contain coded pictures of video data, the file also including a sample entry that includes an element that indicates whether all SPSs that are activated when a stream to which the sample entry applies is decoded have syntax elements that indicate that temporal sub-layer up-switching to any higher temporal sub-layer can be performed at any sample associated with the SPSs; and means for outputting the file.

In another example, this disclosure describes a non-transitory computer-readable storage medium having instructions stored thereon that, when executed, configure one or more processors to determine, based on an element in a sample entry of a file that contains samples that contain coded pictures of video data, that all SPSs that are activated when a stream to which the sample entry applies is decoded have syntax elements that indicate that temporal sub-layer up-switching to any higher temporal sub-layer can be performed at any sample associated with the SPSs.

In another example, this disclosure describes a non-transitory computer-readable storage medium having instructions stored thereon that, when executed, configure one or more processors to generate a file that stores coded samples that contain coded pictures of video data, the file also including a sample entry that includes an element that indicates whether all SPSs that are activated when a stream to which the sample entry applies is decoded have syntax elements that indicate that temporal sub-layer up-switching to any higher temporal sub-layer can be performed at any sample associated with the SPSs.

The details of one or more examples of the disclosure are set forth in the accompanying drawings and the description below. Other features, objects, and advantages will be apparent from the description, drawings, and claims.

DETAILED DESCRIPTION

Figure 1:
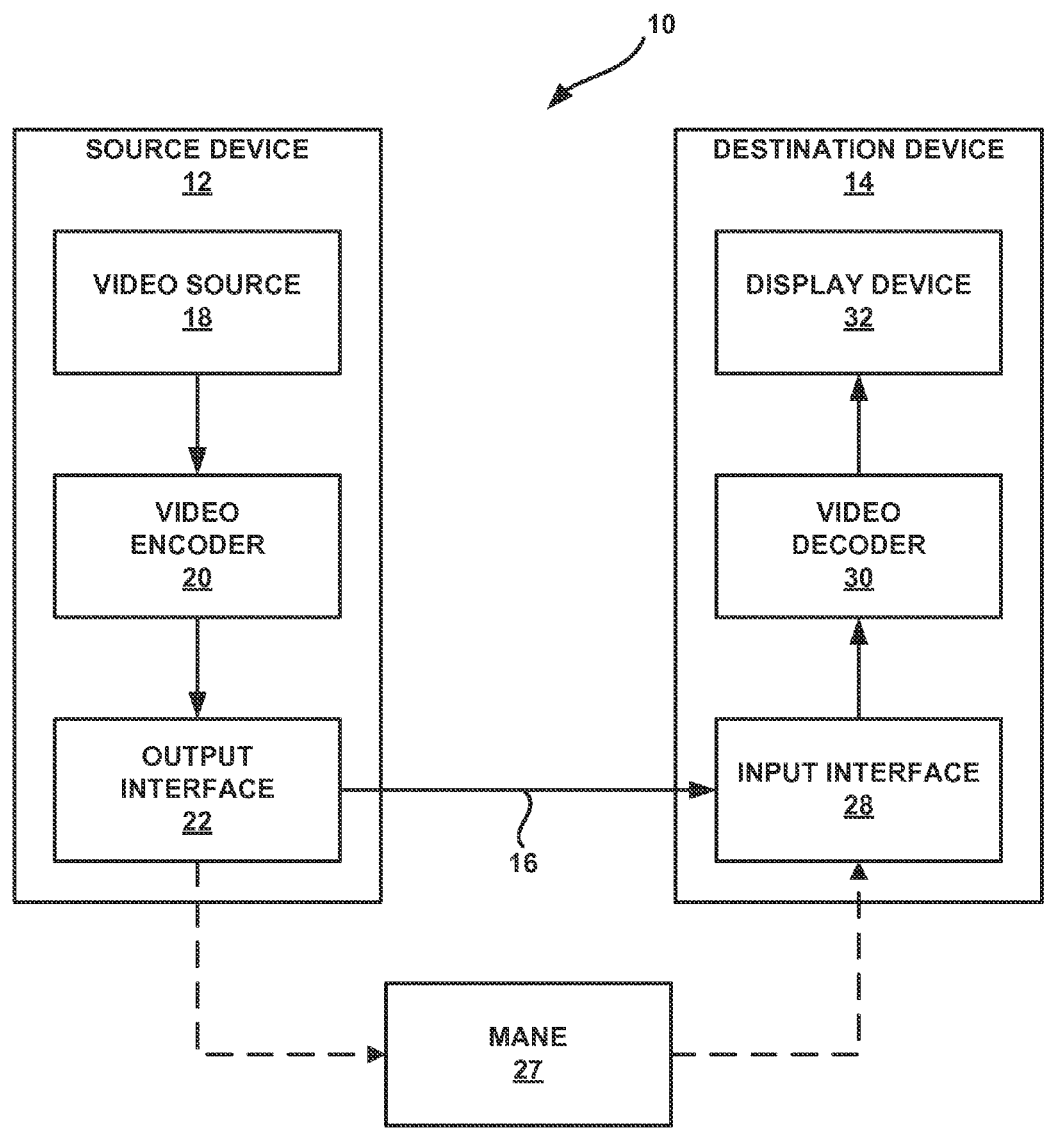
FIG. 1 is a block diagram illustrating an example video coding system that may utilize the techniques described in this disclosure.

A bitstream, such as a High Efficiency Video Coding (HEVC) bitstream, may comprise a sequence of bits that forms a representation of coded pictures and associated data forming one or more coded video sequences (CVSs). A coded picture may comprise a coded representation of a picture containing all coding tree units of the picture. A coding tree unit (CTU) may comprise a coding tree block (CTB) of luma samples and two corresponding CTBs of chroma samples and syntax structures used to code the samples. A CVS may comprise a sequence of access units. Each of the access units may comprise a set of coded pictures associated with the same time instance.

A media aware network element (MANE) or other type of device may apply bitstream thinning to a HEVC bitstream that is encoded with multiple sub-layers. A subset of pictures within a layer that may be decoded without reference to other pictures within the layer may be referred to herein as a "sub-layer" or a "temporal sub-layer." The temporal identifier of a Network Abstraction Layer (NAL) unit identifies a sub-layer with which the NAL unit is associated. Thus, each sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

At any point in the bitstream, a MANE can start removing Network Abstraction Layer (NAL) units of higher sub-layers on the basis that the pictures in the lower sub-layers are still decodable since the decoding process for the pictures in the lower sub-layers does not depend on the NAL units of the higher sub-layers. The action of removing all NAL units with temporal identifiers higher than a certain value can be referred to as temporal down-switching. Temporal down-switching may always be possible.

The action of starting to forward NAL units of a certain sub-layer that has not been forwarded up until that point can be referred to as temporal up-switching. In some examples, temporal up-switching is only possible if none of the pictures in the layer that is switched to depend on any picture in the same sub-layer prior to the point in the bitstream at which the switch was performed. Points in a bitstream at which temporal up-switching is possible may be referred to as sub-layer switching points.

In HEVC, there are two picture types associated with sub-layer switching points, namely the temporal sub-layer access (TSA) picture type and the step-wise temporal sub-layer access (STSA) picture type. The TSA and STSA picture types can be used to indicate temporal sub-layer switching points. A TSA picture enables up-switching, at the TSA picture, to the sub-layer containing the TSA picture or any higher sub-layer, from the immediately lower sub-layer. An STSA picture enables up-switching, at the STSA picture, to the sub-layer containing the STSA picture, from the immediately lower sub-layer. Thus, in contrast to a TSA picture, an STSA does not necessarily enable up-switching to any higher sub-layer, just the sub-layer containing the STSA picture.

In accordance with a file format for storage of HEVC content (i.e., an HEVC file format), a file may comprise a plurality of "boxes." Thus, files conforming to the HEVC file format may comprise a series of objects, called boxes. A "box" may be an object-oriented building block defined by a unique type identifier and a length. In some instances, all data in a file conforming to the HEVC file format may be contained within boxes and there may be no data in the file that is not in a box.

Furthermore, a file conforming to the HEVC file format may include a plurality of tracks. Each track may be a timed sequence of related samples. In the context of the HEVC file format, a "sample" may comprise data associated with a single timestamp. Examples of a sample include: an individual frame of video, a series of video frames in decoding order, or a compressed section of audio in decoding order.

Furthermore, in the HEVC file format, a sample grouping is an assignment of each of the samples in a track to be a member of one sample group. Samples in a sample group are not required to be contiguous. Sample groups may be represented by two data structures: a SampleToGroup box and a SampleGroupDescription box. The SampleToGroup box represents the assignment of samples to sample groups. There may be one instance of the SampleGroupDescription box for each sample group entry. A SampleGroupDescription box describes the properties of the corresponding sample group.

There are several problems or shortcomings with existing designs of the file format for storage of HEVC content. For example, there is no compact way for signaling samples that contain STSA pictures (also referred to as STSA samples). In another example, there is no efficient way for signaling whether temporal sub-layer up-switching to any higher temporal layer can be performed at any sample.

The techniques of this disclosure may solve one or more of the previously-mentioned problems or shortcomings. In accordance with an example technique of this disclosure, a device (e.g., a video encoder or another device) may generate a file that comprises a plurality of samples that contain coded pictures. The file may also include a box (e.g., a SampleToGroupBox) that identifies a sample group that contains one or more samples from among the plurality of samples. The box further indicates that each sample in the sample group is a STSA sample. Accordingly, a device (e.g., a video decoder or another device) may identify, based on data in a box that identifies a sample group, STSA samples from among samples in a file that contains the box.

In accordance with another example technique of this disclosure, a video encoder or another device may generate a file that stores coded samples that contain coded pictures of the video data. The file may also include a box that includes a record that includes an element that indicates whether all sequence parameter sets (SPSs) that are activated when a stream to which the record applies is decoded have syntax elements that indicate that temporal sub-layer up-switching to any higher temporal sub-layer can be performed at any sample associated with the SPSs. Accordingly, a video decoder or other device may determine, based on an element in a record in a box of a file that contains samples that contain coded pictures of the video data, that all SPSs that are activated when a stream to which the record applies is decoded have syntax elements that indicate that temporal sub-layer up-switching to any higher temporal sub-layer can be performed at any sample associated with the SPSs.

For instance, a video encoder may generate an HEVC decoder configuration record. The HEVC decoder configuration record may include a temporalIdNested element. The temporalIDNested element may indicate whether temporal sub-layer up-switching to any higher temporal layer can be performed at any sample of a stream to which the HEVC decoder configuration record applies.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g. laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as International Organization for Standardization (ISO)/IEC MPEG-4 Visual and ITU-T H.264 (also known as ISO/IEC MPEG-4 AVC), including its Scalable Video Coding (SVC) extension, Multiview Video Coding (MVC) extension, and MVC-based three-dimensional video (3DV) extension. In some instances, any bitstream conforming to the MVC-based 3DV extension of H.264/AVC always contains a sub-bitstream that is compliant to the MVC extension of H.264/AVC. Furthermore, video encoder 20 and video decoder 30 may operate according to a 3DV coding extension to H.264/AVC (i.e., AVC-based 3DV) that is currently under development. In other examples, video encoder 20 and video decoder 30 may operate according to International Telecommunication Union Telecommunication Standardization Sector (ITU-T) H.261, International Organization for Standardization (ISO)/International Electrotechnical Commission (IEC) Moving Picture Experts Group (MPEG)-1 Visual, ITU-T H.262 or ISO/IEC MPEG-2 Visual, and ITU-T H.264, ISO/IEC Visual.

In other examples, video encoder 20 and video decoder 30 may operate according to the High Efficiency Video Coding (HEVC) developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, $10^{th}$ Meeting, Stockholm, Sweden, July 2012, which as of Sep. 17, 2013, is available from http://phenix.int-evry.fr/jct/doc_end_user/documents/10_Stockholm/wg11/JCTVC-J1003-v8.zip. Furthermore, video encoder 20 and video decoder 30 may operate according to scalable video coding, multi-view coding, and 3DV extensions for HEVC that are currently under development. The scalable video coding extension of HEVC may be referred to as SHEVC. The 3DV extension of HEVC may be referred to as HEVC-based 3DV or 3D-HEVC.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. In this disclosure, the phrase "based on" may indicate "based at least in part on." If video encoder 20 uses inter prediction to generate the predictive blocks of a PU, video encoder 20 may generate the predictive blocks of the PU based on decoded samples of one or more pictures other than the picture associated with the PU.

To support inter prediction, video encoder 20 may generate one or more reference picture lists. These reference picture lists may be referred to as RefPicList0 and RefPicList1. In some examples, video encoder 20 may generate different reference picture lists for different pictures or different slices of pictures. Hence, different PUs of different pictures and/or slices may be associated with different versions of RefPicList0 and RefPicList1.

Furthermore, when video encoder 20 uses inter prediction to generate a predictive block of a PU, video encoder 20 may signal motion information for the PU. The motion information may include a reference index for the PU and a motion vector for the PU. The reference index for the PU may indicate a position, within one of the reference picture lists associated with the PU, of a reference picture. The motion vector for the PU may indicate a spatial displacement between a prediction block of the PU and a reference location in the reference picture. Video encoder 20 may use samples of the reference picture associated with the reference location to generate a predictive block for the PU. Because a PU may be associated with two reference pictures, the PU may have two reference indexes and two motion vectors. Hence, a PU may have a RefPicList0 reference index and a RefPicList1 reference index. The PU's RefPicList0 reference index indicates a reference picture in the PU's version of RefPicList0. The PU's RefPicList1 reference index indicates a reference picture in the PU's version of RefPicList1. Similarly, the PU may have a RefPicList0 motion vector and a RefPicList1 motion vector. The PU's RefPicList0 motion vector may indicate a reference location in a reference picture in the PU's version of RefPicList0. The PU's RefPicList1 motion vector may indicate a reference location in a reference picture in the PU's version of RefPicList1

Video encoder 20 may signal a PU's reference indexes and motion vectors in a bitstream. In other words, video encoder 20 may include, in the bitstream, data that indicate the PU's reference indexes and motion vectors. Video decoder 30 may reconstruct the PU's versions of RefPicList0 and/or RefPicList1 and may use the PU's reference indexes and motion vectors to determine one or more predictive blocks for the PU. Video decoder 30 may use the predictive blocks for the PU, along with residual data, to decode samples.

After video encoder 20 generates predictive luma blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block may be a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate an RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units. NAL units that contain parameter sets (e.g., video parameter sets (VPSs), sequence parameter sets (SPSs), PPSs, etc.) may be referred to as parameter set NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. In the context of multi-view coding, the term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. In some examples, a view component may be a texture view component (i.e., a texture picture) or a depth view component (i.e., a depth picture).

Multi-view coding supports inter-view prediction. Inter-view prediction is similar to the inter prediction used in HEVC and may use the same syntax elements. However, when a video coder performs inter-view prediction on a current video unit (such as a PU), the video coder may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in a non-base view, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

For instance, NAL units may include headers (i.e., NAL unit headers) and payloads (e.g., RBSPs). The NAL unit headers may include nuh_reserved_zero_6 bits syntax elements. NAL units that have nuh_reserved_zero_6 bit syntax elements that specify different values belong to different "layers" of a bitstream. Thus, in multi-view coding, 3DV, or SVC, the nuh_reserved_zero_6 bits syntax element of a NAL unit specifies a layer identifier (i.e., a layer ID) of the NAL unit. In some examples, the nuh_reserved_zero_6 bits syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_reserved_zero_6 bits syntax element may have a non-zero value. In multi-view coding and 3DV coding, different layers of a bitstream may correspond to different views. In SVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

NAL units may include temporal_id syntax elements. The temporal_id syntax element of a NAL unit specifies a temporal identifier of the NAL unit. The temporal identifier of a NAL unit identifies a sub-layer with which the NAL unit is associated. Thus, each sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

In H.264/AVC and HEVC, SPSs may contain information that applies to all slices of a CVS. In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

HEVC and other video coding standards provide mechanisms for enabling random access into bitstreams. Random access refers to a decoding of a bitstream starting from a coded picture that is not the first coded picture in the bitstream. Random access to a bitstream may be needed in various video applications, such as broadcasting and streaming. Random access to a bitstream may enable users to tune in to a program at any time, to switch between different channels, to jump to specific parts of a video, or to switch to a different bitstream for stream adaptation (e.g., adaption of a bit rate, adaptation of a frame rate, adaptation of a spatial resolution, etc.). The insertion of random access point (RAP) pictures into a bitstream at regular intervals may enable random access. Example types of RAP pictures include IDR pictures, CRA pictures, and BLA pictures. Hence, IDR pictures, CRA pictures and BLA pictures are collectively referred to as random access point (RAP) pictures.

An IDR picture contains only I slices (i.e., slices in which only intra prediction is used). An IDR picture may be the first picture in the bitstream in decoding order, or may appear later in the bitstream. Each IDR picture is the first picture of a CVS in decoding order. IDR pictures, as specified in HEVC and H.264/AVC, may be used for random access. However, pictures following an IDR picture in decoding order cannot use pictures decoded prior to the IDR picture as reference. Accordingly, bitstreams relying on IDR pictures for random access can have significantly lower coding efficiency than bitstreams that use additional types of random access pictures. An IDR access unit is an access unit that contains an IDR picture.

The concept of CRA pictures was introduced in HEVC to allow pictures that follow a CRA picture in decoding order, but precede the CRA picture in output order, to use pictures decoded before the CRA picture for reference. Pictures that follow a CRA picture in decoding order, but precede the CRA picture in output order, are referred to as leading pictures associated with the CRA picture (or leading pictures of the CRA picture). That is, to improve coding efficiency, the concept of CRA pictures was introduced in HEVC to allow pictures that follow a CRA picture in decoding order but precede the CRA picture in output order to use pictures decoded before the CRA picture as reference. A CRA access unit is an access unit in which the coded picture is a CRA picture.

The leading pictures of a CRA picture are correctly decodable if the decoding starts from an IDR picture or CRA picture occurring before the CRA picture in decoding order. However, the leading pictures of a CRA picture may be non-decodable when random access from the CRA picture occurs. Hence, a video decoder typically decodes the leading pictures of a CRA picture during random access decoding. To prevent error propagation from reference pictures that may not be available depending on where the decoding starts, no picture that follows a CRA picture both in decoding order and output order may use any picture that precedes the CRA picture either in decoding order or output order (which includes the leading pictures) as reference.

The concept of a broken link access (BLA) picture was introduced in HEVC after the introduction of CRA pictures and is based on the concept of CRA pictures. A BLA picture typically originates from bitstream splicing at the position of a CRA picture, and in the spliced bitstream the splicing point CRA picture is changed to a BLA picture. An access unit that contains a RAP picture may be referred to herein as a RAP access unit. A BLA access unit is an access unit that contains a BLA picture.

One difference between BLA pictures and CRA pictures is as follows. For a CRA picture, the associated leading pictures are correctly decodable if the decoding starts from a RAP picture before the CRA picture in decoding order. However, the leading pictures associated with a CRA picture may not be correctly decodable when random access from the CRA picture occurs (i.e., when decoding starts from the CRA picture, or in other words, when the CRA picture is the first picture in the bitstream). In contrast, there may be no scenario where the leading pictures associated with a BLA picture are decodable, even when decoding starts from a RAP picture before the BLA picture in decoding order.

Some of the leading pictures associated with a particular CRA picture or a particular BLA picture may be correctly decodable even when the particular CRA picture or the particular BLA picture is the first picture in a bitstream. These leading pictures may be referred to as decodable leading pictures (DLPs). Other leading pictures may be referred to as non-decodable leading pictures (NLPs). HEVC Working Draft 8 may also refer to NLPs as tagged for discard (TFD) pictures.

A VPS is a syntax structure comprising syntax elements that apply to zero or more entire CVSs. An SPS is a syntax structure containing syntax elements that apply to zero or more entire CVSs. An SPS may include a syntax element that identifies a VPS that is active when the SPS is active. Thus, the syntax elements of a VPS may be more generally applicable than the syntax elements of a SPS.

A parameter set (e.g., a VPS, SPS, PPS, etc.) may contain an identification that is referenced, directly or indirectly, from a slice header of a slice. The referencing process is known as "activation." Thus, when video decoder 30 is decoding a particular slice, a parameter set referenced, directly or indirectly, by a syntax element in a slice header of the particular slice is said to be "activated." Depending on the parameter set type, the activation may occur on a per picture basis or a per sequence basis. For example, a slice header of a slice may include a syntax element that identifies a PPS. Thus, when a video coder codes the slice, the PPS may be activated. Furthermore, the PPS may include a syntax element that identifies a SPS. Thus, when a PPS that identifies the SPS is activated, the SPS may be activated.

The SPS may include a syntax element that identifies a VPS. Thus, when a SPS that identifies the VPS is activated, the VPS is activated.

HEVC and other video coding standards specify profiles, tiers, and levels. Profiles, tiers, and levels specify restrictions on bitstreams and hence limits on the capabilities needed to decode the bitstreams. Profiles, tiers, and levels may also be used to indicate interoperability points between individual decoder implementations. Each profile may specify a subset of algorithmic features and limits that is supported by all video decoders conforming to that profile. Video encoders are not required to make use of all features supported in a profile. Each level of a tier may specify a set of limits on the values that syntax elements may have. The same set of tier and level definitions may be used with all profiles, but individual implementations may support different tiers and, within a tier, different levels for each supported profile. For any given profile, a level of a tier may generally correspond to a particular decoder processing load and memory capability. Capabilities of video decoders may be specified in terms of the ability to decode video streams conforming to the constraints of particular profiles, tiers, and levels. For each such profile, the tier and level supported for that profile may also be expressed. Some video decoders may not be able to decode particular profiles, tiers, or levels.

In HEVC, profiles, tiers, and levels may be signaled by the syntax structure profile_tier_level( ) syntax structure. The profile_tier_level( ) syntax structure may be included in a VPS and/or a SPS. The profile_tier_level( ) syntax structure may include a general_profile_idc syntax element, a general_tier_flag syntax element, and a general_level_idc syntax element. The general_profile_idc syntax element may indicate a profile to which a CVS conforms. The general_tier_flag syntax element may indicate a tier context for interpretation of the general_level_idc syntax element. The general_level_idc syntax element may indicate a level to which a CVS conforms. Other values for these syntax elements may be reserved.

Capabilities of video decoders may be specified in terms of the ability to decode video streams conforming to the constraints of profiles, tiers, and levels. For each such profile, the tier and level supported for that profile may also be expressed. In some examples, video decoders do not infer that a reserved value of the general_profile_idc syntax element between the values specified in HEVC indicates intermediate capabilities between the specified profiles. However, video decoders may infer that a reserved value of the general_level_idc syntax element associated with a particular value of the general_tier_flag syntax element between the values specified in HEVC indicates intermediate capabilities between the specified levels of the tier.

One or more HEVC bitstreams may be stored in a file that conforms to a particular file format. In some examples, one or more video data bitstreams (e.g., HEVC bitstreams) may be stored in a file that conforms to an ISO base media file format (ISOBMFF). ISOBMFF may also be referred to as ISO/IEC 14496-12. Other example file formats for storage of video data bitstreams include file formats derived from ISOBMFF, including the MPEG-4 file format (ISO/IEC 14496-14), the Third Generation Partnership Project (3GPP) file format (3GPP TS 26.244), and the AVC file format (ISO/IEC 14496-15). An amendment to the AVC file format for storage of HEVC video content is under development by MPEG. This AVC file format amendment may be referred to as the HEVC file format. That is, the HEVC file format is being developed by MPEG, which is becoming a part of ISO/IEC 14496-15.

A file conforming to the HEVC file format may have a logical structure, a time structure, and a physical structure. The logical structure of the file may be that of a movie that contains a set of time parallel tracks. The time structure of the file is that the tracks contain sequences of samples in time. The sequences of samples may be mapped into a timeline of the movie by edit lists. In the context of the HEVC file format, a "sample" may comprise data associated with a single timestamp. Examples of a sample include: an individual frame of video, a series of video frames in decoding order, or a compressed section of audio in decoding order.

Physically, a file conforming to the HEVC file format may comprise a series of objects, called boxes. A box may be an object-oriented building block defined by a unique type identifier and length. In some instances, all data in a file conforming to the HEVC file format may be contained within boxes and there may be no data in the file that is not in a box. A file conforming to the HEVC file format may include various types of boxes.

For example, a file conforming to the HEVC file format may include a file type box, a media data box, a movie box, a movie fragment box, and so on. In this example, a file type box includes file type and compatibility information. A media data box may contain samples (e.g., coded pictures). A movie box may contain metadata regarding a movie (e.g., logical and timing relationships between samples, and also pointers to locations of samples). Movie boxes may include several types of sub-boxes. The sub-boxes in movie boxes may include one or more track boxes. A track box may include information about an individual track of a movie. A track box may include a track header box that specifies overall information of a single track. In addition, a track box may include a media box that contains a media information box. The media information box may include a sample table box that contains data indexing of media samples in the track. Information in the sample table box may be used to locate samples in time and, for each of the samples of the track, a type, size, container, and offset into that container of the sample.

Furthermore, a sample table box may include one or more SampleToGroup boxes and one or more sample group description boxes (i.e. SampleGroupDescription boxes). A SampleToGroup box may be used to determine a sample group to which a sample belongs, along with an associated description of the sample group. In other words, a SampleToGroup box may indicate a group to which a sample belongs. A SampleToGroup box may have a box type of "sbgp." A SampleToGroup box may include a grouping type element (e.g., grouping_type). The grouping type element may be an integer that identifies a type (i.e., a criterion used to form the sample groups) of a sample grouping. Furthermore, a SampleToGroup box may include one or more entries. Each entry in a SampleToGroup box may be associated with a different, non-overlapping series of consecutive samples in the track. Each entry may indicate a sample count element (e.g., sample_count) and a group description index element (e.g., group_description_index). The sample count element of an entry may indicate a number of samples associated with the entry. In other words, the sample count element of the entry may be an integer that gives the number of consecutive samples with the same sample group descriptor. The group description index element may identify a SampleGroupDescription box that contains a description of the samples associated with the entry. The group description index elements of multiple entries may identify the same SampleGroupDescription box.

In some examples, the following pseudo-code describes a SampleToGroup box.

```
aligned(8) class SampleToGroupBox
        extends FullBox('sbgp', version = 0, 0)
{
        unsigned int(32) grouping_type;
        unsigned int(32) entry_count;
        for (i=1; i <= entry_count; i++)
        {
                unsigned int(32) sample_count;
                unsigned int(32) group_description_index;
        }
}
```

As indicated above, a sample table box may include zero or more SampleGroupDescription boxes. A SampleGroupDescription box may include a description of a sample group. There may be multiple instances of the SampleGroupDescription box if there is more than one sample grouping for the samples in a track. A SampleGroupDescription box may have a box type of "sgpd."

In some examples, the following pseudo-code describes a SampleGroupDescription box.

```
aligned(8) class SampleGroupDescriptionBox (unsigned int(32)
handler_type)
        extends FullBox('sgpd', 0, 0){
        unsigned int(32) grouping_type;
        unsigned int(32) entry_count;
        int i;
        for (i = 1 ; i <= entry_count ; i++){
                switch (handler_type){
                        case 'vide': // for video tracks
                                VisualSampleGroupEntry ( );
                                break;
                        case 'soun': // for audio tracks
                                AudioSampleGroupEntry( );
                                break;
                        case 'hint': // for hint tracks
                                HintSampleGroupEntry( );
                                break;
                }
        }
}
```

As shown in the pseudo-code above, a SampleGroupDescription box may include a grouping_type element, an entry_count element, and one or more entries. The grouping_type element of a SampleGroupDescriptionBox may be an integer that identifies a SampleToGroup box that is associated with the SampleGroupDescription box. The entry_count element may indicate a number of entries in the SampleGroupDescription box. Each entry in the SampleGroupDescription box may include a VisualSampleGroupEntry object, an AudioSampleGroupEntry object, or a HintSampleGroupEntry object. A VisualSampleGroupEntry object may provide a description about a group of visual (e.g., video) samples. An AudioSampleGroupEntry object may provide a description about a group of audio samples. A HintSampleGroupEntry object may provide a description about a group of hint samples. VisualSampleGroupEntry objects and AudioSampleGroupEntry objects may belong to an abstract class that extends an abstract SampleGroupDescriptionEntry class.

Furthermore, a sample table box may include a sample description box that comprises a format description for a stream. In particular, the sample description box may include a list of one or more sample entries. Each of the sample entries may contain a name of a media type (e.g., a type of decoder needed to decode the stream) and any parameterization of that decoder needed. For instance, in the context of HEVC, a sample entry may include an HEVC decoder configuration record. Thus, an HEVC decoder configuration record may be a sub-box of a sample table box. An HEVC decoder configuration record may include decoder configuration information for ISO/IEC 23008-2 (i.e. HEVC) video content. For example, a HEVC decoder configuration record may include one or more NAL units that contain parameter sets (e.g., VPSs, SPS, PPSs, etc.)

As indicated above, a file conforming to the HEVC file format may include a movie fragment box. A movie fragment box may contain metadata regarding a movie fragment (i.e., a fragment of a movie). A movie fragment box may include a track fragment box that includes information about a fragment of a track of a movie fragment. Furthermore, a track fragment box may include one or more SampleToGroup boxes that may indicate sample groups to which samples of a movie fragment belong.

In the example of FIG. 1, video coding system 10 includes a media aware network element (MANE) 27. MANE 27 may receive video data generated by source device 12 and may forward video data to destination device 14. MANE 27 (or other type of device) may apply bitstream thinning to an HEVC bitstream that is encoded with multiple sub-layers. At any point in the bitstream, MANE 27 can start removing NAL units of higher sub-layers (i.e., sub-layers associated with higher temporal identifiers) based on the fact that the pictures in the lower sub-layers (i.e., sub-layers associated with lower temporal identifiers) are still decodable because the decoding process for the pictures in the lower sub-layers does not depend on the NAL units of the higher sub-layers. The action of removing all NAL units with temporal identifiers higher than a certain value can be referred to as temporal down-switching. Temporal down-switching may always be possible. Thus, the term temporal sub-layer switching point may refer to a picture that has no dependency on any other picture that is in the same sub-layer as the picture and that precedes the picture in decoding order.

The term "temporal up-switching" may refer to the action of starting to forward NAL units of a certain sub-layer that has not been forwarded up until that point. Temporal up-switching may only be possible if none of the pictures in the layer that is switched to depend on any picture in the same sub-layer prior to the point in the bitstream at which the switch was performed.

In the scalable video coding extension of the H.264/AVC video coding standard (i.e., H.264/SVC), temporal sub-layer switching points can be indicated through temporal_id_nesting_flag syntax elements in SPSs. For instance, if a temporal_id_nesting_flag syntax element in a SPS applicable to a particular CVS is equal to 1, all pictures in the CVS with temporal identifiers greater than 0 may be temporal layer switching points. Furthermore, in H.264/SVC, temporal level switching point SEI messages may indicate temporal sub-layer switching points. In some examples where temporal level switching point SEI messages indicate temporal sub-layer switching points, a temporal level switching point SEI message may contain information about how long a period temporal layer M should have been decoded prior to a switch point in order to switch up to temporal layer M+1 at the switch point.

In HEVC, as in H.264/SVC, a SPS may include a sps_temporal_id_nesting_flag syntax element. When the sps_temporal_id_nesting_flag syntax element has a value equal to 1, all pictures with temporal identifiers greater than 0 are sub-layer switching points. In HEVC, there may be two picture types associated with sub-layer switching points, namely the temporal sub-layer access (TSA) picture type and the step-wise temporal sub-layer access (STSA) picture type. The TSA and STSA picture types can be used to indicate temporal sub-layer switching points.

A TSA picture and pictures following the TSA picture in decoding order do not use pictures with temporal identifiers equal to or greater than that of the TSA picture for inter prediction reference. A TSA picture enables up-switching, at the TSA picture, to the sub-layer containing the TSA picture or any higher sub-layer, from the immediately lower sub-layer. In some examples, all TSA pictures have temporal identifiers greater than 0.

An STSA picture does not use pictures with the same TemporalId as the STSA picture for inter prediction reference. Pictures following an STSA picture in decoding order with the same temporal identifier as the STSA picture do not use pictures prior to the STSA picture in decoding order with the same temporal identifier as the STSA picture for inter prediction reference. An STSA picture enables up-switching, at the STSA picture, to the sub-layer containing the STSA picture, from the immediately lower sub-layer. In some examples, all STSA pictures have temporal identifiers greater than 0. Thus, in contrast to a TSA picture, an STSA picture does not necessarily enable up-switching to any higher sub-layer. Rather, an STSA picture may only enable up-switching to the sub-layer containing the STSA picture.

There are several problems or shortcomings with existing designs of the file format for storage of HEVC content. For example, there is no compact way for signaling of samples that contain STSA pictures (also referred to as STSA samples). In another example, there may be no efficient way for signaling of samples that contain intra pictures. Signaling of samples that contain intra pictures may enable certain types of trick mode play that only use intra pictures. In another example, there may be no efficient way to signal whether temporal sub-layer up-switching to any higher temporal layer can be performed at any sample.

In accordance with one example technique of this disclosure, a sample group, named a step-wise temporal sub-layer access sample group, for which the sample grouping type may be 'stsa', marks STSA samples. With this mechanism, a video coder or other device may easily identify STSA samples.

In accordance with this example technique, a device (e.g., video encoder 20 or another device) may generate a file that comprises a plurality of samples that contain coded pictures. The file may also include a box (e.g., a SampleToGroupBox) that identifies a sample group that contains one or more samples from among the plurality of samples. The box further indicates that each sample in the sample group is a STSA sample. In some examples, the device may output the file. In such examples, an output interface (e.g., a network interface, a disk or drive interface, a memory access system, etc.) of the device may output the file.

Similarly, a device (e.g., video decoder 30 or another device) may identify, based on data in a box that identifies a sample group, STSA samples from among samples in a file that contains the box. In some examples, an input interface (e.g., a network interface, a disk or drive interface, a memory access system, etc.) of the device may receive the file that contains the box that identifies the sample group. Furthermore, in some examples, the device may perform temporal up-switching at one of the STSA samples in the sample group. Furthermore, in some examples, video decoder 30 may decode one or more of the STSA samples.

Furthermore, in accordance with some example techniques of this disclosure, a sample group, named an intra picture sample group (i.e., an intra picture sample grouping entry), for which the sample grouping type may be 'ipsg', is designed to mark samples that contain intra coded pictures (also referred to intra samples). Thus, an HEVC video track may contain zero instances or one instance of a SampleToGroupBox with a grouping_type element of "ipsg." With this mechanism, samples containing intra coded pictures can be easily identified, through the intra picture sample group only. Video decoder 30 may decode one or more of the intra coded pictures.

Alternatively, the intra picture sample group only marks samples that contain non-RAP intra coded pictures, i.e., intra pictures that are not RAP pictures as defined in HEVC Working Draft 8. With this mechanism, samples containing intra coded pictures can be easily identified, through both the sync sample table, which marks all the samples that contain RAP pictures, and the intra picture sample group. In this way, a device (e.g., video encoder 20 or another device) may generate a file that comprises non-random access point (non-RAP) intra coded pictures, wherein a sample group marks the non-RAP intra coded pictures in the file.

Furthermore, in accordance with some example techniques of this disclosure, whether temporal sub-layer up-switching to any higher temporal layer can be performed at any sample is signaled in a sample entry, e.g., using a flag. In some examples, video encoder 20 or another device may generate a record (e.g., an HEVC decoder configuration record) that includes an element. The element having a first value indicates that temporal sub-layer up-switching to any higher temporal layer can be performed at any sample. The element having a second value indicates that it is not guaranteed that temporal sub-layer up-switching to any higher temporal layer can be performed at any sample. Furthermore, in some examples, when the element has the first value, all SPSs that are activated when a stream to which the record applies is decoded have syntax elements that indicate whether temporal sub-layer up-switching to any higher temporal layer can be performed at any sample.

In this way, a device (e.g., video encoder 20 or other device) may generate a file that stores coded samples that contain coded pictures of the video data. The file may also include a box that includes a record (e.g., a decoder configuration record such as an HEVC decoder configuration record) that includes an element that indicates whether all SPSs that are activated when a stream to which the record applies is decoded have syntax elements that indicate that temporal sub-layer up-switching to any higher temporal sub-layer can be performed at any sample associated with the SPSs. In some examples, an output interface (e.g., a network interface, a disk or drive interface, a memory access system, etc.) of the device may output the file. Accordingly, a device (e.g., video decoder 30 or another device) may determine, based on an element in a record (e.g., a decoder configuration record such as an HEVC decoder configuration record) in a box of a file that contains samples that contain coded pictures of the video data, that all SPSs that are activated when a stream to which the record applies is decoded have syntax elements that indicate that temporal sub-layer up-switching to any higher temporal sub-layer can be performed at any sample associated with the SPSs. In some examples, an input interface (e.g., a network interface, a disk or drive interface, a memory access system, etc.) of the device may receive the file that contains the samples that contain the coded pictures of video data. Furthermore, in some examples, the device may perform temporal up-switching at a sample associated with one of the SPSs.

The techniques of this disclosure may also apply to other video content encoded using video codecs other than HEVC.

Figure 2:
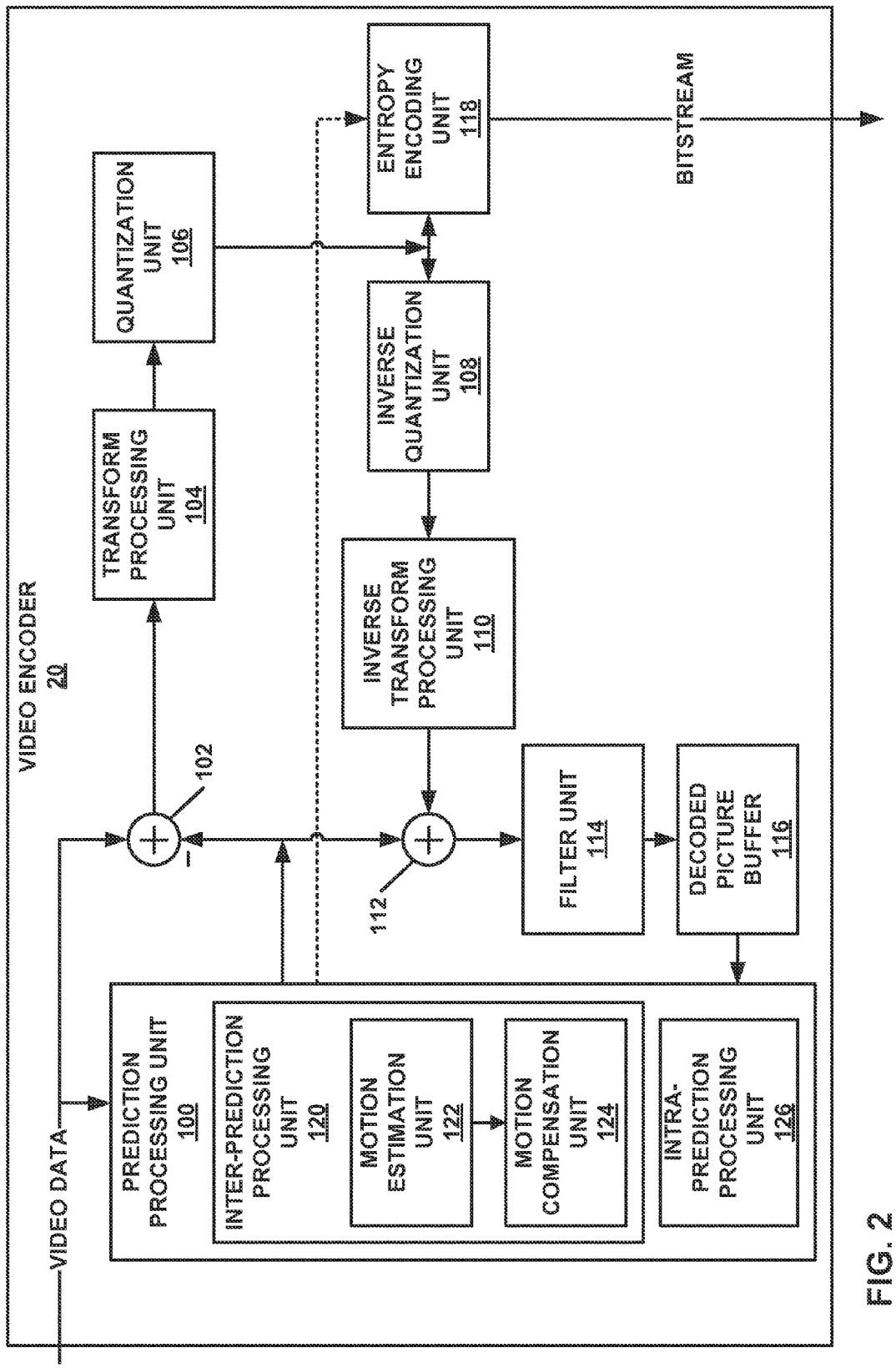
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb, and Cr coding blocks of a CU and the selected predictive luma. Cb, and Cr blocks of the PUs of the CU, luma, Cb, and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

In some examples, video encoder 20 may generate a file that includes the bitstream. In accordance with one or more techniques of this disclosure, the file may comprise a plurality of samples that contain coded pictures. The file may also comprise a box that identifies a sample group that contains one or more samples from among the plurality of samples. The box may further indicate that each sample in the sample group is a STSA sample. Furthermore, in accordance with one or more techniques of this disclosure, the file may store coded samples that contain coded pictures of video data. The file may also include a box that includes a record that includes an element that indicates whether all SPSs that are activated when a stream to which the record applies is decoded have syntax elements that indicate that temporal sub-layer up-switching to any higher temporal sub-layer can be performed at any sample associated with the SPSs.

Figure 3:
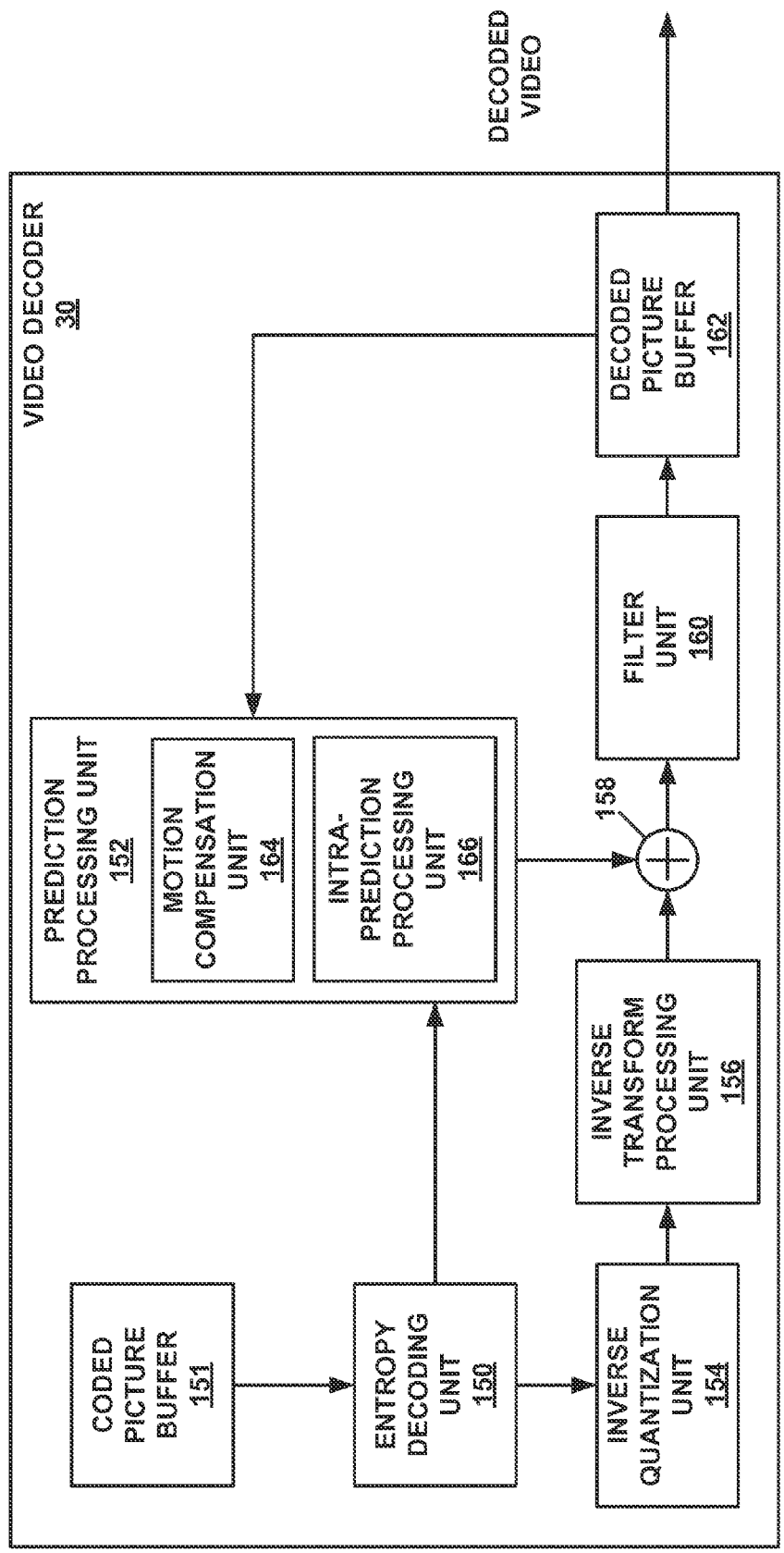
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units. As part of decoding the bitstream, entropy decoding unit 150 may parse and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma. Cb, and Cr blocks for the PU.

Reconstruction unit 158 may use the residual values from the luma, Cb, and Cr transform blocks associated with TUs of a CU and the predictive luma. Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma. Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma. Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

As indicated above, a file that conforms to a HEVC file format may include zero or more instances of a SampleToGroup box. Furthermore, as indicated above, each SampleToGroup box may include a grouping type element that identifies a type of a sample grouping. In accordance with one or more techniques of this disclosure, a SampleToGroup box may include a grouping type element with a value (e.g., "stsa") that indicates that samples belonging to a sample group associated with the SampleToGroup box are STSAs. For example, an HEVC video track may contain zero instances or one instance of a SampleToGroupBox with a grouping_type of "stsa." Instances of SampleToGroup boxes with grouping type elements with values that indicate that samples belonging to sample groups associated with the SampleToGroup boxes are STSAs (e.g., SampleToGroup boxes with grouping_type "stsa") may be referred to as step-wise temporal sub-layer sample group entries. A step-wise temporal sub-layer sample group entry may represent a marking of samples as step-wise temporal sub-layer access points (i.e., STSAs). In other words, the step-wise temporal sub-layer sample group entry may be a sample group used to mark STSA samples. The grouping types of a step-wise temporal sub-layer sample group entry may have a group type of "stsa."

Thus, a video encoder or another device may generate a box (e.g., a SampleToGroup box) identifying a sample group that contains one or more samples from among a plurality of samples in a file. The box may further indicate (e.g., by specifying the grouping type of "stsa") that each sample in the sample group is an STSA sample. Accordingly, a video decoder or another device may identify, based on data in the box, STSA samples from among the samples in the file.

As indicated above, a SampleGroupDescription box may include a description of a sample group. Furthermore, as indicated above, a SampleGroupDescription box may include zero or more entries. The entries in a SampleGroupDescription box may include one or more VisualSampleGroupEntry objects. A VisualSampleGroupEntry object may provide a description about a group of visual (e.g., video) samples. A VisualSampleGroupEntry object may belong to a VisualSampleGroupEntry class. In accordance with one or more techniques of this disclosure, a StepWiseTemporalSubLayerEntry class may extend the VisualSampleGroupEntry class. Thus, an entry in a SampleGroupDescription box may include an object belonging to the StepWiseTemporalSubLayerEntry class (i.e., a StepWiseTemporalSubLayerEntry object). Hence, a SampleGroupDescription box may be a container of a StepWiseTemporalSubLayerEntry object. It may not be mandatory for a file to contain a StepWiseTemporalSubLayerEntry object and the file may contain zero or more StepWiseTemporalSubLayerEntry objects.

Thus, the following description may apply to step-wise temporal sub-layer sample group entries:

Group Types: 'stsa'
Container: Sample Group Description Box ('sgpd')
Mandatory: No
Quantity: Zero or more
This sample group is used to mark step-wise temporal sub-layer access (STSA) samples.
The following is an example syntax for a step-wise temporal sub-layer sample group entry.

```
class StepWiseTemporalSubLayerEntry( ) extends
VisualSampleGroupEntry ('stsa')
{
}
```

In some examples, an instance of a SampleGroupDescription box that includes a StepWiseTemporalSubLayerEntry object may accompany a step-wise temporal sub-layer sample group entry (e.g., an instance of a SampleToGroup box with a grouping type element of "stsa"). Hence, in some examples, when a SampleToGroup box has a grouping type of "stsa," an accompanying instance of the SampleGroupDescription box with the same grouping type shall be present.

In accordance with one or more techniques of this disclosure, an HEVC video track may contain zero instances or one instance of a SampleToGroup box with a grouping_type element of "ipsg." Instances of SampleToGroup boxes with grouping_type element of "ipsg" may be referred to as intra picture sample groupings. A SampleToGroup box instance with a grouping type of "ipsg" (i.e., an intra picture sample grouping) may represent a marking of samples as step-wise temporal sub-layer access points. Thus, a video encoder or another device may generate a box (e.g., a SampleToGroup box) identifying a sample group that contains one or more samples from among a plurality of samples in a file. The box may further indicate (e.g., by specifying the grouping type of "ipsg") that each sample in the sample group is an intra sample. Accordingly, a video decoder or another device may identify, based on data in the box, intra samples from among the samples in the file.

In some examples, an accompanying instance of the SampleGroupDescription box with the same grouping type is present in the HEVC video track. As indicated above, a SampleGroupDescription box may include zero or more entries. The entries in a SampleGroupDescription box may include one or more VisualSampleGroupEntry objects. A VisualSampleGroupEntry object may belong to a VisualSampleGroupEntry class. Furthermore, in accordance with one or more techniques of this disclosure, an IntraPictureEntry class may extend the VisualSampleGroupEntry class. Thus, an entry in a SampleGroupDescription box may include an object belonging to the IntraPictureEntry class (i.e., an IntraPictureEntry object or an intra picture sample grouping entry). Hence, a SampleGroupDescription box may be a container of an IntraPictureEntry object. It may not be mandatory for a file to contain an IntraPictureEntry object and the file may contain zero or more IntraPictureEntry objects. In this way, a file may include a sample group description box (e.g., a SampleGroupDescription box) that includes an entry (e.g., an IntraPictureEntry object) that indicates that a sample group is used to mark samples that contain intra coded pictures.

Thus, the following description may apply to IntraPictureEntry entries:
Group Types: 'ipsg'
Container. Sample Group Description Box ('sgpd')
Mandatory: No
Quantity: Zero or more
This sample group is used to mark samples that contain intra coded pictures, i.e. samples for which all slices are intra slices.
The following is an example syntax for an intra picture sample grouping entry.

```
class IntraPictureEntry( ) extends VisualSampleGroupEntry ('ipsg')
{
}
```

As indicated above, the HEVC file format provides for an HEVC decoder configuration record. For instance, a sample table box within a track box of a file that conforms to the HEVC file format may include an HEVC decoder configuration record. The HEVC decoder configuration record contains configuration information for HEVC video content. For instance, the HEVC decoder record may include zero or more NAL units. The NAL units contained in an HEVC decoder record may include NAL units that contain parameter sets, such as VPSs, SPSs, PPSs, etc.

The following provides an example syntax for a HEVC decoder configuration record. Portions of the following syntax shown in bold may indicate modified portions of the HEVC decoder configuration record specified in MPEG output document W12846, "Study of ISO/IEC 14496-15: 2010/PDAM 2 Carriage of HEVC", the 101th meeting of MPEG, Stockholm, Sweden, 2012-07-16 to 2012-07-20.

```
aligned(8) class HEVCDecoderConfigurationRecord {
    unsigned int(8) configurationVersion = 1;
    unsigned int(2) profile_space;
    unsigned int(1) tier_flag;
    unsigned int(5) profile_idc;
    unsigned int(32) profile_compatibility_indications;
    unsigned int(16) constraint_indicator_flags;
    unsigned int(8) level_idc;
    bit(6) reserved = '111111'b;
    unsigned int(2) chromaFormat;
    bit(5) reserved = '11111'b;
    unsigned int(3) bitDepthLumaMinus8;
    bit(5) reserved = '11111'b;
    unsigned int(3) bitDepthChromaMinus8;
    bit(16) avgFrameRate;
    bit(2) constantFrameRate;
    bit(3) numTemporalLayers;
    bit(1) temporalIdNested;
    unsigned int(2) lengthSizeMinusOne;
    unsigned int(8) numOfArrays;
    for (j=0; j < numOfArrays; j++) {
        bit(1) array_completeness;
        unsigned int(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

The HEVC decoder configuration record contains a size of a length field (e.g., lengthSizeMinusOne) used in each sample to indicate the length of NAL units contained by the HEVC decoder configuration record, as well as the parameter sets, if stored in a sample entry. The HEVC decoder configuration record may be externally framed. In other words, the size of the HEVC decoder configuration record may be supplied by the structure that contains the HEVC decoder configuration record.

Furthermore, the HEVC decoder configuration record may contain a version field. In the example syntax provided above, this version field is named configurationVersion. Incompatible changes to the record may be indicated by a change of version number. In some examples, a device or other reader must not attempt to decode a HEVC decoder configuration record or streams to which the HEVC decoder configuration record applies if the device or other reader does not recognize the version number specified by the version field of the HEVC decoder configuration record. In some examples, compatible extensions to the HEVC decoder configuration record do not extend the HEVC decoder configuration record and do not change the configuration version code specified by the version field of the HEVC decoder configuration record. A device or other reader may, in some examples, be prepared to ignore unrecognized data beyond the definition of the data that the device or other reader understands.

A VPS may include, among other syntax elements, a general_profile_space syntax element, a general_profile_idc syntax element, a general_profile_compatibility_flag[i] syntax element, and a general_reserved_zero_16 bits syntax element. The general_profile_space syntax element specifies a context for the interpretation of the general_profile_idc syntax element and the general_profile_compatibility_flag[i] syntax element for all values of i in the range of 0 to 31, inclusive. When the general_profile_space syntax element is equal to 0, the general_profile_idc syntax element indicates the profile to which a CVS conforms. Annex A of HEVC Working Draft 8 describes an example set of profiles. When the general_profile_space syntax element is equal to 0 and the general_profile_compatibility_flag[i] syntax element is equal to 1, the general_profile_compatibility_flag[i] syntax element indicates that a CVS conforms to a profile indicated by the general_profile_idc syntax element equal to i. When the general_profile_space syntax element is equal to 0, the general_profile_idc[general_profile_idc] is equal to 1, "general_profile_idc[general_profile_idc]" denotes the general_profile_idc syntax element associated with an index value specified by the general_profile_idc syntax element. In some examples, the general_profile_compatibility_flag[i] syntax element is equal to 0 for any value of i that is not specified as an allowed value of general_profile_idc. Annex A of HEVC Working Draft 8 specifies an example set of allowed values of the general_profile_idc syntax element. The general_reserved_zero_16 bits syntax element is equal to 0 in bitstreams. Certain values of the general_reserved_zero_16 bits syntax elements may be used for extensions of HEVC.

Furthermore, a VPS may include a profile_tier_level syntax structure that includes a general_tier_flag syntax element and a general_level_idc syntax element. The general_tier_flag syntax element specifies a tier context for the interpretation of the general_level_idc syntax element. The general_level_idc syntax element indicates a level to which a CVS conforms. Annex A of HEVC Working Draft 8 specifies an example interpretation of the general_level_idc syntax element based on the tier context specified by the general_tier_flag syntax element.

In the example syntax of HEVC decoder configuration records provided above, the profile_space, tier_flag, profile_idc, profile_compatibility_indications, constraint_indicator_flags, and level_idc elements contain matching values for the syntax elements general_profile_space, general_tier_flag, general_profile_idc, general_profile_compatibility_flag[i] for i ranging from 0 to 31, inclusive, general_reserved_zero_16 bits, and general_level_idc, respectively, as defined in ISO/IEC 23008-2, for the stream to which this HEVC decoder configuration record applies.

In one example, the values for the profile_space, tier_flag, profile_idc, profile_compatibility_indications, constraint_indicator_flags, and level_idc elements of a HEVC decoder configuration record must be valid for all parameter sets that are activated when the stream described by the HEVC decoder configuration record is decoded (referred to as all parameter sets of the stream or all the parameter sets). In other words, in this example, the values of the profile_space, tier_flag, profile_idc, profile_compatibility_indications, constraint_indicator_flags, and level_idc elements of a HEVC decoder configuration record must correctly describe the values of a corresponding syntax elements in the parameter sets that are activated when the stream described by the HEVC decoder configuration record is decoded.

For instance, the general_profile_space syntax elements in each of the VPSs activated when the stream is decoded may have values identical to a value of the profile_space element. In other words, the value of the profile_space element in all the parameter sets must be identical. Hence, the HEVC decoder configuration record may include a profile space element (e.g., a profile_space element). All general profile space flag syntax elements (e.g., general_profile_space syntax elements) in parameter sets that are activated when a stream to which the HEVC decoder configuration record applies is decoded may have values matching values of the profile space element.

Furthermore, in this example, the tier indication (e.g., tier_flag) must indicate a tier equal to or greater than the highest tier indicated in all the parameter sets activated when the stream described by the HEVC decoder configuration record is decoded. Hence, the HEVC decoder configuration record may include a tier flag element (e.g., a tier_flag element). A device may determine that all general tier flag syntax elements (e.g., general_tier_flag syntax elements) in parameter sets that are activated when a stream to which the HEVC decoder configuration record applies is decoded have values matching a value of the tier flag element. Each of the general tier flag syntax elements may indicate a tier context for interpretation of general level indicator syntax elements that indicate levels to which coded video sequences conform.

In this example, the level indication element (e.g., level_idc) must indicate a level of capability equal to or greater than the highest level indicated for the highest tier in all the parameter sets. Hence, the HEVC decoder configuration record may include a level indicator element (e.g., a level_idc element). A device may determine that all general level indication syntax elements (e.g., general_level_idc syntax elements) in parameter sets that are activated when a stream to which the HEVC decoder configuration record applies is decoded have values matching a value of the level element. Each of the general level indication syntax elements may indicate a level to which a coded video sequence conforms.

In this example, the profile indication element (e.g., profile_idc) must indicate a profile to which the stream associated with the HEVC decoder configuration record conforms. Hence, the HEVC decoder configuration record may include a profile indicator element (e.g., a profile_idc element). A device may determine that all profile indication syntax elements (e.g., profile_idc syntax elements) in parameter sets that are activated when a stream to which the HEVC decoder configuration record applies is decoded have values matching a value of the profile indication element.

Each of the profile indication syntax elements may indicate a profile to which a coded video sequence conforms.

Each bit in profile_compatibility_indications element may only be set if all the parameter sets set that bit. Hence, the HEVC decoder configuration record may include a profile compatibility indications element (e.g., a profile_compatibility_indications element). A device may determine that all general profile compatibility flag syntax elements (e.g., general_profile_compatibility_flag syntax elements) in parameter sets that are activated, when a stream to which the HEVC decoder configuration record is applicable is decoded, have values that match values of the profile compatibility indications element.

In addition, the HEVC decoder configuration record may include a constraint indicator flags element (e.g., a constraint_indicator_flags element). A device may determine that all general reserved zero 16 bits syntax elements (e.g. general_reserved_zero_16 bits syntax elements) in parameter sets that are activated when a stream to which the HEVC decoder configuration record applies is decoded have values that match values of the constraint indicator flags element.

Because HEVC decoder configuration records specify the profile_space, tier_flag, profile_idc, profile_compatibility_indications, constraint_indicator_flags, and level_idc elements, a device (e.g., video decoder 30) may be able to determine the corresponding properties of the stream without parsing the stream. Rather, the device may determine the corresponding properties of the stream by inspecting a HEVC decoder configuration record that applies to the stream.

If the SPSs of the stream are marked with different profiles, then the stream may need examination to determine the profile, if any, to which the entire stream conforms. If the entire stream is not examined, or the examination reveals that there is no profile to which the entire stream conforms, then, in this example, the entire stream must be split into two or more sub-streams with separate configuration records (e.g., HEVC decoder configuration records) in which these rules can be met.

An HEVC decoder configuration record may provide explicit indication about the chroma format and bit depth as well as other format information used by a HEVC video elementary stream. An elementary stream may comprise a sequence of one or more bitstreams. If an elementary stream contains multiple bitstreams, each of the bitstreams except for the last bitstream terminates with an end of bitstream (EOS) NAL unit.

In some examples, each type of such information must be identical in all parameter sets, if present, in a single HEVC decoder configuration record. If two sequences differ in any type of such information, a video processor may be required to generate two different HEVC decoder configuration records. If the two sequences differ in color space indications in their video usability information (VUI), a video processor (e.g., video encoder 20 or another device) may be required to generate two different HEVC decoder configuration records. In HEVC, a SPS may include a VUI syntax structure that contains VUI syntax elements.

In the example syntax for HEVC decoder configuration records described above, the chromaFormat element contains a chroma_format indicator as defined by the chroma_format_idc syntax element in ISO/IEC 23008-2 (i.e., HEVC), for the stream to which this HEVC decoder configuration record applies. The chroma_format_idc syntax element of an SPS may specify a chroma sampling. In HEVC Working Draft 8, the chroma_format_idc syntax element specifies the chroma sampling relative to a luma sampling specified in subclause 6.2 of HEVC Working Draft 8. If the chroma_format_idc syntax element of a SPS activated for a current picture is equal to 0, the current picture may consist of one sample array (e.g., $S_L$). Otherwise, if the chroma_format_idc syntax element is not equal to 0, the current picture may comprise three sample arrays (e.g., $S_L$, $S_{Cb}$, and $S_{Cr}$).

In the example syntax for the HEVC decoder configuration record provided above, the bitDepthLumaMinus8 element contains a luma bit depth indicator as defined by the bit_depth_luma_minus8 syntax element in ISO/IEC 23008-2, for the stream to which this HEVC decoder configuration record applies. The bitDepthChromaMinus8 element may contain a chroma bit depth indicator as defined by the bit_depth_chroma_minus8 syntax element in ISO/IEC 23008-2, for the stream to which this configuration record applies. The bit depth for a sample value (e.g., a luma sample or a chroma sample) may indicate how many bits are used to represent the sample value.

In addition, in the example syntax for HEVC decoder configuration record provided above, the avgFrameRate element gives an average frame rate in units of frames/(256 seconds), for the stream to which the HEVC decoder configuration record applies. An avgFramRate element having a value equal to 0 may indicate an unspecified average frame rate.

In the example syntax for the HEVC decoder configuration record provided above, the constantFrameRate element equal to 1 may indicate that the stream to which this HEVC decoder configuration record applies is of constant frame rate. The constantFrameRate element equal to 2 may indicate that the representation of each temporal layer in the stream is of constant frame rate. The constantFrameRate element equal to 0 indicates that the stream may or may not be of constant frame rate.

Furthermore, in the example syntax for the HEVC decoder configuration record provided above, the numTemporalLayers element may indicate whether the stream to which the HEVC decoder configuration record applies is temporally scalable and whether the contained number of temporal layers (also referred to as temporal sub-layer or sub-layer in ISO/IEC 23008-2) is equal to numTemporalLayers. For example, the numTemporalLayers syntax element greater than 1 may indicate that the stream to which this HEVC decoder configuration record applies is temporally scalable and that the contained number of temporal layers is equal to numTemporalLayers. In this example, the numTemporalLayers element equal to 1 may indicate that the stream is not temporally scalable. Furthermore, in this example, the numTemporalLayers element equal to 0 may indicate that it is unknown whether the stream is temporally scalable.

In the example syntax for the HEVC decoder configuration record provided above, the temporalIdNested element may indicate whether all SPSs that are activated when the stream to which the HEVC decoder configuration record applies have sps_temporal_id_nesting_flag syntax elements equal to 0. For example, the temporalIdNested element equal to 1 may indicate that all SPSs that are activated when the stream to which the HEVC decoder configuration record applies is decoded have sps_temporal_id_nesting_flag syntax elements as defined in ISO/IEC 23008-2 equal to 1 and temporal sub-layer up-switching to any higher temporal layer can be performed at any sample. In this example, the temporalIdNested element equal to 0 may indicate that at least one of the SPSs that are activated when the stream to which the HEVC decoder configuration record applies is decoded has a sps_temporal_id_nesting_flag syntax element equal to 0.

In this way, a device may generate a file that stores coded samples that contain coded pictures of the video data. The file also including a box that includes a record that includes an element that indicates whether all SPSs that are activated when a stream to which the record applies is decoded have sps_temporal_id_nesting_flag syntax elements that indicate that temporal sub-layer up-switching to any higher temporal sub-layer can be performed at any sample associated with the SPSs.

In the example syntax for the HEVC decoder configuration record provided above, the lengthSizeMinusOne element plus 1 indicates the length in bytes of the NALUnitLength field in an HEVC video sample in the stream to which the HEVC decoder configuration record applies. For example, a size of one byte is indicated with a value of 0. The value of this field shall be one of 0, 1, or 3 corresponding to a length encoded with 1, 2, or 4 bytes, respectively.

Furthermore, a HEVC decoder configuration may contain a set of arrays that carry initialization NAL units. In other words, in a HEVC decoder configuration record there is a set of arrays to carry initialization NAL units. The NAL unit types in a HEVC decoder configuration record may be restricted to NAL units that contain VPSs, SPSs, PPSs, and SEI messages. HEVC Working Draft 8 and the present disclosure provide for several reserved NAL unit types. In the future, such reserved NAL unit types may be defined to implement extensions to HEVC. In other words. NAL unit types that are reserved in ISO/IEC 23008-2 and in this specification may acquire a definition in future. In some examples, readers (e.g., devices that receive and process an HEVC decoder configuration record) should ignore arrays of NAL units with reserved or unpermitted NAL unit type values. This 'tolerant' behavior of ignoring arrays of NAL units with reserved or unpermitted NAL unit type values is designed so that errors are not raised, thereby allowing the possibility of backwards-compatible extensions to these arrays in future specifications. In some examples, the arrays may be in the order of VPS, SPS, PPS, and SEI. In other examples, the arrays may be ordered within a HEVC decoder configuration record by size. For instance, the arrays may be ordered within a HEVC decoder configuration record such that smaller arrays occur before larger arrays.

Furthermore, in the example syntax for HEVC decoder configuration records provided above, the numArrays element indicates the number of arrays of NAL units of the indicated type(s). The array_completeness elements of HEVC decoder configuration records may indicate whether the stream may include NAL units of a given type in addition to those NAL units of the given type that are in an array in the HEVC decoder configuration record. For example, an array_completeness element equal to 1 may indicate that all NAL units of the given type are in the array of NAL units in the HEVC decoder configuration record and none are in the stream. An array_completeness element equal to 0 indicates that additional NAL units of the indicated type may be in the stream. The default and permitted values of the array_completeness element may be constrained by the sample entry code.

Furthermore, in the example syntax of HEVC decoder configuration records provided above, the NAL_unit_type element indicates the type of the NAL units in the array of NAL units. In this example, all of the NAL units in the array must belong to the type specified by the NAL_unit_type element. The NAL_unit_type element may take a value as defined in ISO/IEC 23008-2. In some examples, the NAL_unit_type element is restricted to take one of the values indicating a VPS, SPS, PPS, or SEI NAL unit.

In the example HEVC decoder configuration record syntax provided above, the numNalus element indicates the number of NAL units of the indicated type included in the HEVC decoder configuration record for the stream to which this HEVC decoder configuration record applies. In some examples, the NAL_unit_type element of the HEVC decoder configuration record may indicate that the HEVC decoder configuration record includes a SEI array (i.e., an array of SEI NAL units). For instance, in such examples, if the numNalus is equal to four, the SEI array may consist of four SEI NAL units. Furthermore, in some such examples, the SEI array must only contain SEI messages of a 'declarative' nature. That is, the SEI array may only contain SEI messages that provide information about the stream as a whole. An example of an SEI message of a 'declarative' nature is a user-data SEI message.

Furthermore, in the example syntax of HEVC decoder configuration records provided above, the nalUnitLength element of the HEVC decoder configuration record indicates the length in bytes of a NAL unit. The nalUnit element of the HEVC decoder configuration record may contain a VPS, a SPS, a PPS, or a declarative SET NAL unit, as specified in ISO/IEC 23008-2.

Figure 4:
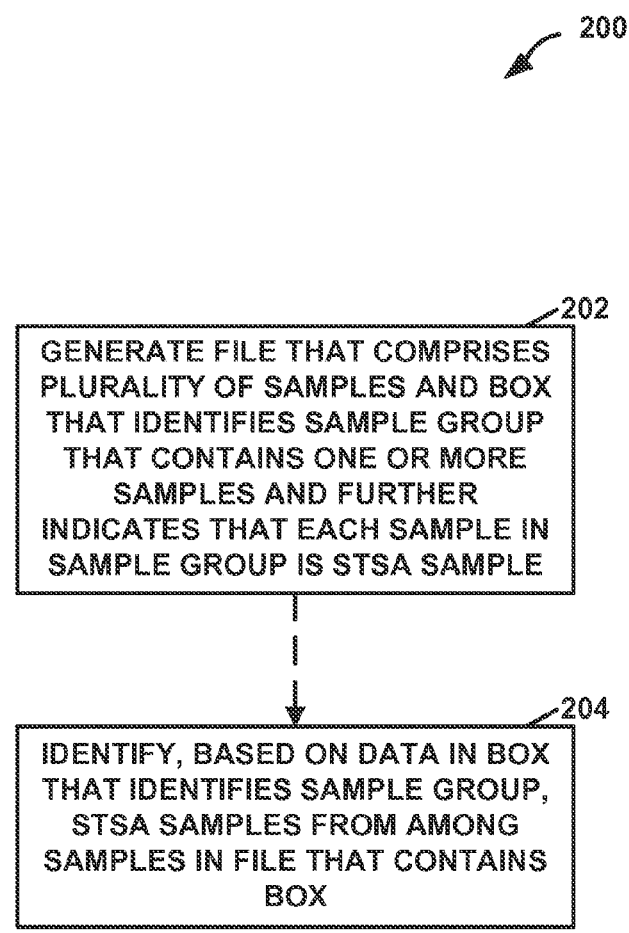
FIG. 4 is a flowchart illustrating an example operation in accordance with one or more techniques of this disclosure.

FIG. 4 is a flowchart illustrating an example operation 200 in accordance with one or more techniques of this disclosure. In the example of FIG. 4, a first device (e.g., video encoder 20 or another device) generates a file (202). The file comprises a plurality of samples that contain coded pictures a box that identifies a sample group that contains one or more samples from among the plurality of samples. The box further indicates that each sample in the sample group is a STSA sample.

Furthermore, in the example of FIG. 4, a second device (e.g., video decoder 30 or another device) identifies, based on data in the box that identifies the sample group, STSA samples from among samples in the file that contains the box (204).

Figure 5:
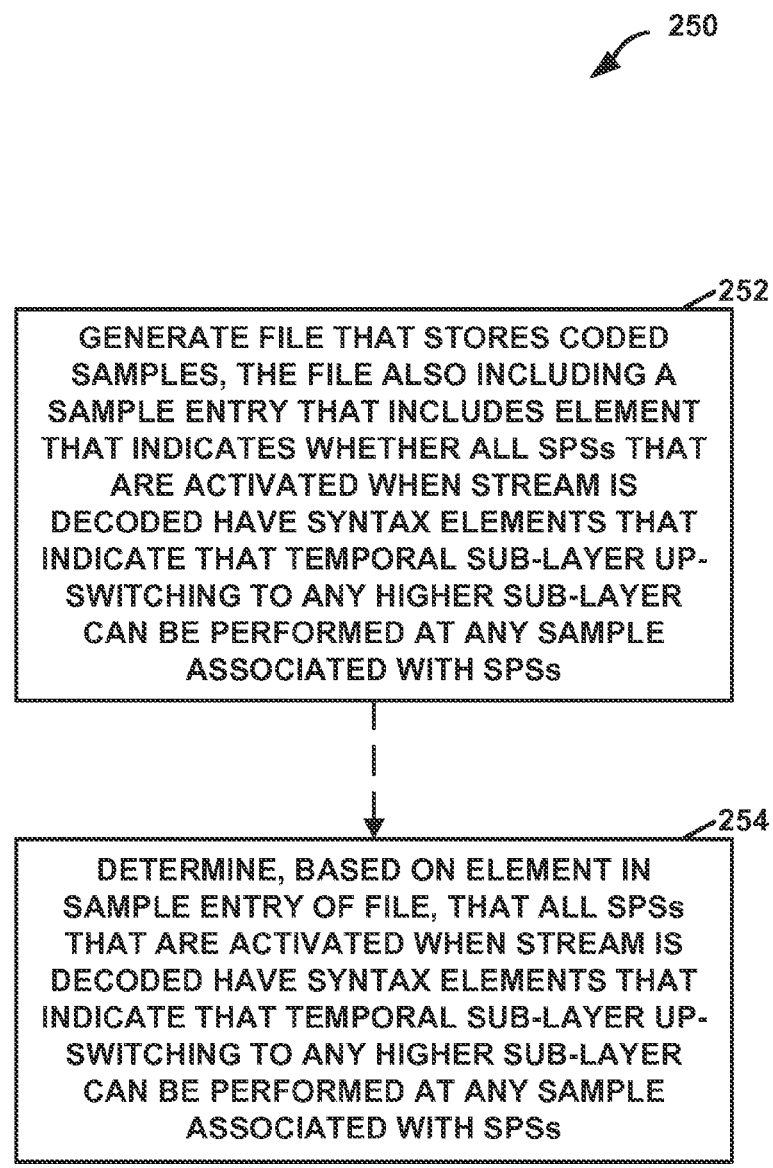
FIG. 5 is a flowchart illustrating an example operation in accordance with one or more additional techniques of this disclosure.

FIG. 5 is a flowchart illustrating an example operation 250 in accordance with one or more additional techniques of this disclosure. In the example of FIG. 5, a first device (e.g., video encoder 20 or another device) may generate a file that stores coded samples that contain coded pictures of the video data (252). The file also may include a sample entry that includes an element that indicates whether all SPSs, that are activated when a stream to which the sample entry applies is decoded, have syntax elements that indicate that temporal sub-layer up-switching to any higher temporal sub-layer can be performed at any sample associated with the SPSs.

Furthermore, in the example of FIG. 5, a second device (e.g., video decoder 30 or another device) may determine, based on the element in the sample entry of the file that contains samples that contain coded pictures of the video data, that all SPSs that are activated when the stream to which the record applies is decoded have syntax elements that indicate that temporal sub-layer up-switching to any higher temporal sub-layer can be performed at any sample associated with the SPSs (254).

Figure 6:
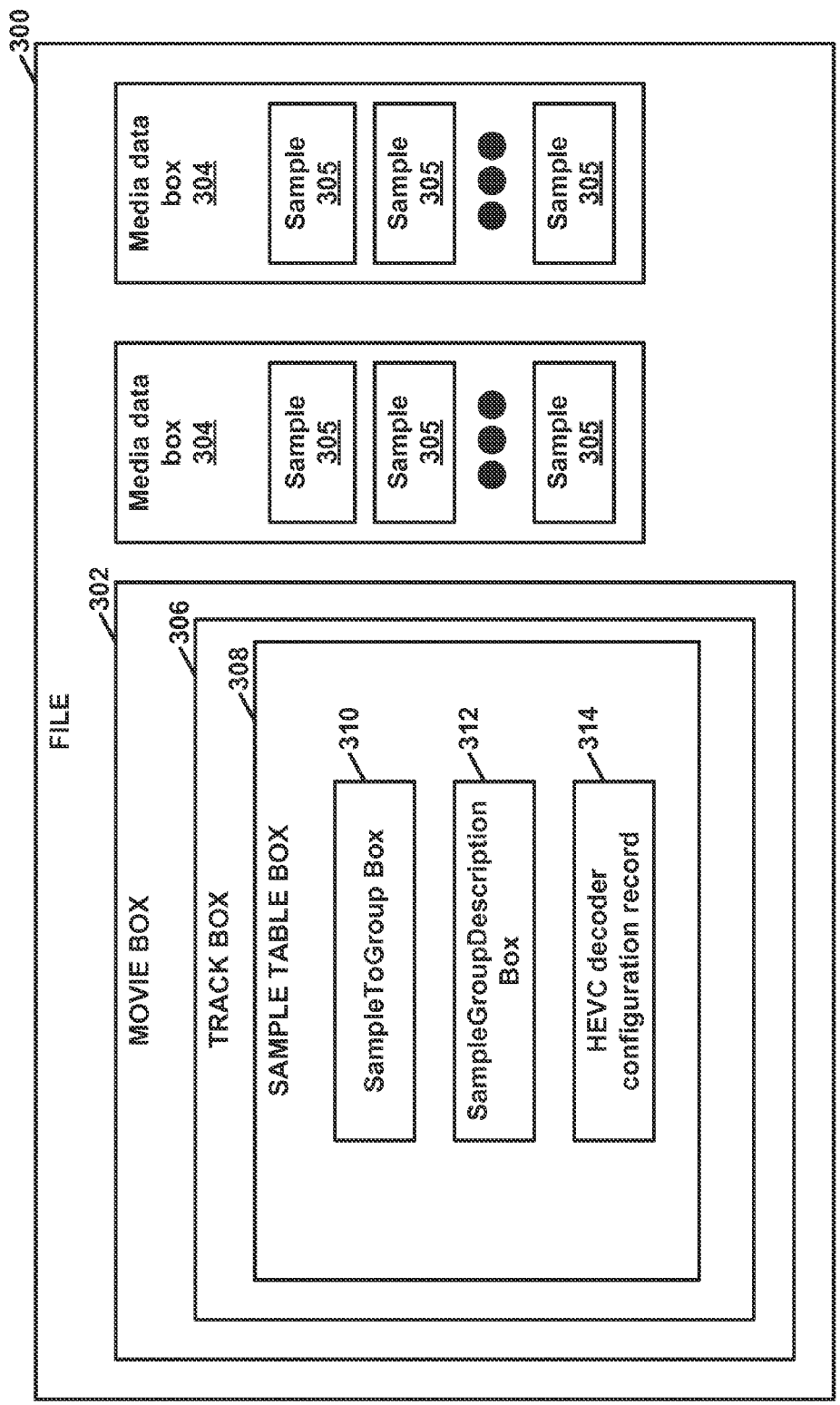
FIG. 6 is a conceptual diagram illustrating an example structure of a file, in accordance with one or more techniques of this disclosure.

FIG. 6 is a conceptual diagram illustrating an example structure of a file 300, in accordance with one or more techniques of this disclosure. In the example of FIG. 6, file 300 includes a movie box 302 and a plurality of media data boxes 304. Each of media data boxes 304 may include one or more samples 305. Furthermore, in the example of FIG.

6, movie box 302 includes a track box 306. In other examples, movie box 302 may include multiple track boxes for different tracks. Track box 306 includes a sample table box 308. Sample table box 308 includes a SampleToGroup box 310, a SampleGroupDescription box 312, and an HEVC decoder configuration record 314. In other examples, sample table box 308 may include other boxes in addition to SampleToGroup box 310 and SampleGroupDescription box 312, and/or may include multiple SampleToGroup boxes and SampleGroupDescription boxes.

In accordance with one or more example techniques of this disclosure, SampleToGroup box 310 may identify a sample group that contains one or more samples from among samples 305. SampleToGroup box 310 may further indicate that each sample in the sample group is a STSA sample. Hence, a device may identify, based on data in SampleToGroup box 310. STSA samples from among samples 305 in file 300. In accordance with one or more additional example techniques of this disclosure, SampleToGroup box 310 may indicate that each sample in the sample group is an intra samples. Hence, a device may identify, based on data in SampleToGroup box 310, intra samples from among samples 305 in file 300.

In accordance with one or more additional example techniques of this disclosure, HEVC decoder configuration record 314 may include an element that indicates whether all SPSs, that are activated when a stream to which HEVC decoder configuration record 314 applies is decoded, have syntax elements that indicate that temporal sub-layer up-switching to any higher temporal sub-layer can be performed at any sample associated with the SPSs. Hence, a device may determine, based on an element in HEVC decoder configuration record 314 in sample table box 308 of file 300 that contains samples 305 that contain coded pictures of video data, that all SPSs that are activated when a stream to which HEVC decoder configuration record 314 applies is decoded have syntax elements that indicate that temporal sub-layer up-switching to any higher temporal sub-layer can be performed at any sample associated with the SPSs.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising determining, based on an element in a sample entry of a file, that, for each respective sequence parameter set (SPS) of a plurality of SPSs that are activated when a stream to which the sample entry applies is decoded, the respective SPS includes a syntax element that indicates that temporal sub-layer up-switching to any higher temporal sub-layer can be performed at any sample associated with the respective SPS, wherein:
   the file contains the sample entry and separately contains samples that contain coded pictures of the video data,
   the element in the sample entry is separate from any of the SPSs, and
   the temporal sub-layer up-switching comprises an action of starting to forward Network Abstraction Layer (NAL) units of a certain temporal sub-layer that have not been forwarded up until that point.

2. The method of claim 1, further comprising performing the temporal sub-layer up-switching at a sample associated with one of the SPSs.

3. The method of claim 1, wherein the element is in a decoder configuration record that is in the sample entry.

4. The method of claim 1, wherein:
the element having a first value indicates that temporal sub-layer up-switching to any higher temporal sub-layer can be performed at any of the samples associated with the SPSs, and
the element having a second value indicates that it is not guaranteed that temporal sub-layer up-switching to any higher temporal sub-layer can be performed at any of the samples associated with the SPSs.

5. The method of claim 1, wherein the syntax element is a sps_temporal_id_nesting_flag syntax element.

6. The method of claim 1, wherein:
the element is a first element,
the sample entry includes a profile space element, and
the method further comprises determining that all general profile space flag syntax elements in parameter sets that are activated when the stream is decoded have values that match values of the profile space element.

7. The method of claim 1, wherein:
the element is a first element,
the sample entry includes a tier flag element, and
the method further comprises determining that all general tier flag syntax elements in parameter sets that are activated when the stream is decoded have values that match a value of the tier flag element, wherein each of the general tier flag syntax elements indicates a tier context for interpretation of general level indicator syntax elements that indicate levels to which coded video sequences conform.

8. The method of claim 1, wherein:
the element is a first element,
the sample entry includes a profile indicator element, and
the method further comprises determining that all profile indication syntax elements in parameter sets that are activated when the stream is decoded have values that match a value of the profile indicator element, wherein each of the profile indication syntax elements indicates a profile to which a coded video sequence conforms.

9. The method of claim 1,
the element is a first element,
the sample entry includes a profile compatibility indications element, and
the method further comprises determining that all general profile compatibility flag syntax elements in parameter sets that are activated when the stream is decoded have values that match values of the profile compatibility indications element.

10. The method of claim 1, wherein:
the element is a first element,
the sample entry includes a constraint indicator flags element, and
the method further comprises determining that all general reserved zero 16 bits syntax elements in parameter sets that are activated when the stream is decoded have values that match values of the constraint indicator flags element.

11. The method of claim 1,
the element is a first element,
the sample entry includes a level indicator element, and
the method further comprises determining that all general level indication syntax elements in parameter sets that are activated when the stream is decoded have values that match a value of the level indicator element, wherein each of the general level indication syntax elements indicates a level to which a coded video sequence conforms.

12. A method of storing coded video data, the method comprising generating a file that contains a sample entry and separately contains samples that contain coded pictures of the video data, the sample entry including an element that indicates that, for each respective sequence parameter set (SPS) of a plurality of SPSs that are activated when a stream to which the sample entry applies is decoded, the respective SPS includes a syntax element that indicates that temporal sub-layer up-switching to any higher temporal sub-layer can be performed at any sample associated with the respective SPS, wherein:
the element included in the sample entry is separate from any of the SPSs, and
the temporal sub-layer up-switching comprises an action of starting to forward Network Abstraction Layer (NAL) units of a certain temporal sub-layer that have not been forwarded up until that point.

13. The method of claim 12, wherein the element is in a decoder configuration record that is in the sample entry.

14. The method of claim 12, wherein:
the element having a first value indicates that temporal sub-layer up-switching to any higher temporal sub-layer can be performed at any of the samples associated with the SPSs, and
the element having a second value indicates that it is not guaranteed that temporal sub-layer up-switching to any higher temporal sub-layer can be performed at any of the samples associated with the SPSs.

15. The method of claim 12, wherein the syntax element is a sps_temporal_id_nesting_flag syntax element.

16. The method of claim 12, wherein:
the element is a first element,
the sample entry includes a profile space element, and
all general profile space flag syntax elements in parameter sets that are activated when the stream is decoded have values that match values of the profile space element.

17. The method of claim 12, wherein:
the element is a first element,
the sample entry includes a tier flag element,
all general tier flag syntax elements in parameter sets that are activated when the stream is decoded have values that match a value of the tier flag element, and
each of the general tier flag syntax elements indicates a tier context for interpretation of general level indicator syntax elements that indicate levels to which coded video sequences conform.

18. The method of claim 12, wherein:
the element is a first element,
the sample entry includes a profile indicator element,
all profile indication syntax elements in parameter sets that are activated when the stream is decoded have values that match a value of the profile indicator element, and
each of the profile indication syntax elements indicates a profile to which a coded video sequence conforms.

19. The method of claim 12,
the element is a first element,
the sample entry includes a profile compatibility indications element, and
all general profile compatibility flag syntax elements in parameter sets that are activated when the stream is decoded have values that match values of the profile compatibility indications element.

20. The method of claim 12, wherein:
the element is a first element,
the sample entry includes a constraint indicator flags element, and
all general reserved zero 16 bits syntax elements in parameter sets that are activated when the stream is decoded have values that match values of the constraint indicator flags element.

21. The method of claim 12, wherein:
the element is a first element,
the sample entry includes a level indicator element,
all general level indication syntax elements in parameter sets that are activated when the stream is decoded have values that match a value of the level indicator element, and
each of the general level indication syntax elements indicates a level to which a coded video sequence conforms.

22. A device for processing video data, the device comprising:
a memory configured to store the video data; and
one or more processors configured to determine, based on an element in a sample entry of a file, that, for each respective sequence parameter set (SPS) of a plurality of SPSs that are activated when a stream to which the sample entry applies is decoded, the respective SPS includes a syntax element that indicates that temporal sub-layer up-switching to any higher temporal sub-layer can be performed at any sample associated with the respective SPS, wherein:
the file contains the sample entry and separately contains samples that contain coded pictures of the video data,
the element in the sample entry is separate from any of the SPSs, and
the temporal sub-layer up-switching comprises an action of starting to forward Network Abstraction Layer (NAL) units of a certain temporal sub-layer that have not been forwarded up until that point.

23. The device of claim 22, wherein the one or more processors are configured to perform the temporal sub-layer up-switching at a sample associated with one of the SPSs.

24. The device of claim 22, wherein the element is in a decoder configuration record that is in the sample entry.

25. The device of claim 22, wherein:
the element having a first value indicates that temporal sub-layer up-switching to any higher temporal sub-layer can be performed at any of the samples associated with the SPSs, and
the element having a second value indicates that it is not guaranteed that temporal sub-layer up-switching to any higher temporal sub-layer can be performed at any of the samples associated with the SPSs.

26. The device of claim 22, wherein the syntax element is a sps_temporal_id_nesting_flag syntax element.

27. The device of claim 22, wherein:
the element is a first element,
the sample entry includes a profile space element, and
the one or more processors are further configured to determine that all general profile space flag syntax elements in parameter sets that are activated when the stream is decoded have values that match values of the profile space element.

28. The device of claim 22, wherein:
the element is a first element,
the sample entry includes a tier flag element,
the one or more processors are further configured to determine that all general tier flag syntax elements in parameter sets that are activated when the stream is decoded have values that match a value of the tier flag element, and
each of the general tier flag syntax elements indicates a tier context for interpretation of general level indicator syntax elements that indicate levels to which coded video sequences conform.

29. The device of claim 22, wherein:
the element is a first element,
the sample entry includes a profile indicator element,
the one or more processors are further configured to determine that all profile indication syntax elements in parameter sets that are activated when the stream is decoded have values that match a value of the profile indicator element, and
each of the profile indication syntax elements indicates a profile to which a coded video sequence conforms.

30. The device of claim 22,
the element is a first element,
the sample entry includes a profile compatibility indications element, and
the one or more processors are further configured to determine that all general profile compatibility flag syntax elements in parameter sets that are activated when the stream is decoded have values that match values of the profile compatibility indications element.

31. The device of claim 22, wherein:
the element is a first element,
the sample entry includes a constraint indicator flags element, and
the one or more processors are further configured to determine that all general reserved zero 16 bits syntax elements in parameter sets that are activated when the stream is decoded have values that match values of the constraint indicator flags element.

32. The device of claim 22,
the element is a first element,
the sample entry includes a level indicator element,
the one or more processors are further configured to determine that all general level indication syntax elements in parameter sets that are activated when the stream is decoded have values that match a value of the level indicator element, and
each of the general level indication syntax elements indicates a level to which a coded video sequence conforms.

33. A device for storing coded video data, the device comprising:
a memory configured to store the video data; and
one or more processors configured to generate a file that contains a sample entry and separately contains samples that contain coded pictures of the video data, the sample entry including an element that indicates that, for each respective sequence parameter set (SPS) of a plurality of SPSs that are activated when a stream to which the sample entry applies is decoded, the respective SPS includes a syntax element that indicates that temporal sub-layer up-switching to any higher temporal sub-layer can be performed at any sample associated with the respective SPS, wherein:
the element in the sample entry is separate from any of the SPSs, and
the temporal sub-layer up-switching comprises an action of starting to forward Network Abstraction Layer (NAL) units of a certain temporal sub-layer that have not been forwarded up until that point.

34. The device of claim 33, wherein the element is in a decoder configuration record that is in the sample entry.

35. The device of claim 33, wherein:
the element having a first value indicates that temporal sub-layer up-switching to any higher temporal sub-layer can be performed at any of the samples associated with the SPSs, and
the element having a second value indicates that it is not guaranteed that temporal sub-layer up-switching to any higher temporal sub-layer can be performed at any of the samples associated with the SPSs.

36. The device of claim 33, wherein the syntax element is a sps_temporal_id_nesting_flag syntax element.

37. The device of claim 33, wherein:
the element is a first element,
the sample entry includes a profile space element, and
all general profile space flag syntax elements in parameter sets that are activated when the stream is decoded have values that match values of the profile space element.

38. The device of claim 33, wherein:
the element is a first element,
the sample entry includes a tier flag element,
all general tier flag syntax elements in parameter sets that are activated when the stream is decoded have values that match a value of the tier flag element, and
each of the general tier flag syntax elements indicate a tier context for interpretation of general level indicator syntax elements that indicate levels to which coded video sequences conform.

39. The device of claim 33, wherein:
the element is a first element,
the sample entry includes a profile indicator element,
all profile indication syntax elements in parameter sets that are activated when the stream is decoded have values that match a value of the profile indicator element, and
each of the profile indication syntax elements indicate a profile to which a coded video sequence conforms.

40. The device of claim 33,
the element is a first element,
the sample entry includes a profile compatibility indications element, and
all general profile compatibility flag syntax elements in parameter sets that are activated when the stream is decoded have values that match values of the profile compatibility indications element.

41. The device of claim 33, wherein:
the element is a first element,
the sample entry includes a constraint indicator flags element, and
all general reserved zero 16 bits syntax elements in parameter sets that are activated when the stream is decoded have values that match values of the constraint indicator flags element.

42. The device of claim 33, wherein:
the element is a first element,
the sample entry includes a level indicator element,
all general level indication syntax elements in parameter sets that are activated when the stream is decoded have values that match a value of the level indicator element, and
each of the general level indication syntax elements indicates a level to which a coded video sequence conforms.

43. A device for processing video data, the device comprising:
means for receiving a file that contains a sample entry and separately contains samples that contain coded pictures of the video data; and
means for determining, based on an element in a sample entry of a file, that, for each respective sequence parameter set (SPS) of a plurality of SPSs that are activated when a stream to which the sample entry applies is decoded, the respective SPS includes a syntax element that indicates that temporal sub-layer up-switching to any higher temporal sub-layer can be performed at any sample associated with the respective SPS, wherein:
the element in the sample entry is separate from any of the SPSs, and
the temporal sub-layer up-switching comprises an action of starting to forward Network Abstraction Layer (NAL) units of a certain temporal sub-layer that have not been forwarded up until that point.

44. A device for storing coded video data, the device comprising:
means generating a file that contains a sample entry and separately contains samples that contain coded pictures of the video data, the sample entry including an element that indicates that, for each respective sequence parameter set (SPS) of a plurality of SPSs that are activated when a stream to which the sample entry applies is decoded, the respective SPS includes a syntax element that indicates that temporal sub-layer up-switching to any higher temporal sub-layer can be performed at any sample associated with the respective SPS, wherein:
the element in the sample entry is separate from any of the SPSs, and
the temporal sub-layer up-switching comprises an action of starting to forward Network Abstraction Layer (NAL) units of a certain temporal sub-layer that have not been forwarded up until that point; and
means for outputting the file.

45. A non-transitory computer-readable storage medium having instructions stored thereon that, when executed, configure one or more processors to determine, based on an element in a sample entry of a file, that, for each respective sequence parameter set (SPS) of a plurality of SPSs that are activated when a stream to which the sample entry applies is decoded, the respective SPS includes a syntax element that indicates that temporal sub-layer up-switching to any higher temporal sub-layer can be performed at any sample associated with the respective SPS, wherein:
the file contains the sample entry and separately contains samples that contain coded pictures of the video data,
the element in the sample entry is separate from any of the SPSs, and
the temporal sub-layer up-switching comprises an action of starting to forward Network Abstraction Layer (NAL) units of a certain temporal sub-layer that have not been forwarded up until that point.

46. A non-transitory computer-readable storage medium having instructions stored thereon that, when executed, configure one or more processors to generate a file that contains a sample entry and separately contains samples that contain coded pictures of the video data, the sample entry including an element that indicates that, for each respective sequence parameter set (SPS) of a plurality of SPSs that are activated when a stream to which the sample entry applies is decoded, the respective SPS includes a syntax element that indicates that temporal sub-layer up-switching to any higher temporal sub-layer can be performed at any sample associated with the respective SPS, wherein:
- the element in the sample entry is separate from any of the SPSs, and
- the temporal sub-layer up-switching comprises an action of starting to forward Network Abstraction Layer (NAL) units of a certain temporal sub-layer that have not been forwarded up until that point.

47. The device of claim 22, wherein the device comprises at least one of:
- an integrated circuit;
- a microprocessor; or
- a wireless communication device.

48. The device of claim 33, wherein the device comprises at least one of:
- an integrated circuit;
- a microprocessor; or
- a wireless communication device.

* * * * *